US010366352B2

(12) United States Patent
Smith et al.

(10) Patent No.: US 10,366,352 B2
(45) Date of Patent: Jul. 30, 2019

(54) METHOD AND SYSTEM FOR COMMUNICATING VEHICLE REPAIR INFORMATION TO A BUSINESS-TO-BUSINESS RENTAL VEHICLE RESERVATION MANAGEMENT COMPUTER SYSTEM

(75) Inventors: David Gary Smith, Wildwood, MO (US); Owen R. Miller, Wildwood, MO (US); Anita K. Klopfenstein, O'Fallon, IL (US); Russell E. Dittmar, St. Charles, MO (US); Doug Kelly, Placentia, CA (US); Michael Anthony Hastings, Ranchos Palos Verdes, CA (US); Carmela Pham, Huntington Beach, CA (US); Erick Bickett, Yorba Linda, CA (US)

(73) Assignee: The Crawford Group, Inc., St. Louis, MO (US)

( * ) Notice: Subject to any disclaimer, the term of this patent is extended or adjusted under 35 U.S.C. 154(b) by 33 days.

(21) Appl. No.: 11/868,266

(22) Filed: Oct. 5, 2007

(65) Prior Publication Data

US 2008/0162199 A1 Jul. 3, 2008

Related U.S. Application Data

(60) Provisional application No. 60/828,540, filed on Oct. 6, 2006.

(51) Int. Cl.
*G06Q 10/02* (2012.01)

(52) U.S. Cl.
CPC .................................. *G06Q 10/02* (2013.01)

(58) Field of Classification Search
CPC .............................. G06Q 10/02; G06Q 10/00
(Continued)

(56) References Cited

U.S. PATENT DOCUMENTS

| 3,665,397 A | 5/1972 | Di Napoli et al. |
| 4,891,785 A | 1/1990 | Donohoo |

(Continued)

FOREIGN PATENT DOCUMENTS

| JP | 2001344490 | 12/2001 |
| WO | 2000052601 A1 | 9/2000 |

(Continued)

OTHER PUBLICATIONS

"Additional Internet Efforts Will Propel Every Segment of Our Business", Free Enterprise, Summer 1999, p. 13.

(Continued)

*Primary Examiner* — Igor N Borissov
(74) *Attorney, Agent, or Firm* — Thompson Coburn LLP

(57) ABSTRACT

Various aspects of a system and method are disclosed for communicating vehicle repair data among a plurality of parties, wherein a data pump is employed to automate the extraction of vehicle repair data such as labor hours estimation data from a repair facility computer system for delivery to interested parties, including a rental vehicle service provider that provides replacement rental vehicles to drivers whose vehicles are undergoing repairs at repair facilities. A reservation management computer system operated by the rental vehicle service provider can thus use the received vehicle repair data to facilitate management of replacement rental vehicle reservations by its business partners, such as insurance companies.

80 Claims, 18 Drawing Sheets

(58) Field of Classification Search
USPC .................................................. 705/1.1, 5
See application file for complete search history.

(56) References Cited

U.S. PATENT DOCUMENTS

| | | | |
|---|---|---|---|
| 4,899,292 A | 2/1990 | Montagna et al. | |
| 4,931,932 A | 6/1990 | Dalnekoff et al. | |
| 4,951,196 A | 8/1990 | Jackson | |
| 5,058,044 A | 10/1991 | Stewart et al. | |
| 5,182,705 A | 1/1993 | Barr et al. | |
| 5,216,592 A | 6/1993 | Mann et al. | |
| 5,218,697 A | 6/1993 | Chung | |
| 5,289,369 A | 2/1994 | Hirshberg | |
| 5,311,425 A | 5/1994 | Inada et al. | |
| 5,432,904 A | 7/1995 | Wong | |
| 5,471,615 A | 11/1995 | Amatsu et al. | |
| 5,504,674 A * | 4/1996 | Chen et al. ..................... | 705/4 |
| 5,528,490 A | 6/1996 | Hill | |
| 5,557,515 A | 9/1996 | Abbruzzese et al. | |
| 5,586,312 A | 12/1996 | Johnson et al. | |
| 5,664,207 A | 9/1997 | Crumpler et al. | |
| 5,726,885 A | 3/1998 | Klein et al. | |
| 5,781,892 A | 7/1998 | Hunt et al. | |
| 5,794,207 A | 8/1998 | Walker et al. | |
| 5,808,894 A | 9/1998 | Wiens et al. | |
| 5,812,067 A | 9/1998 | Bergholz et al. | |
| 5,819,274 A | 10/1998 | Jackson, Jr. | |
| 5,832,454 A | 11/1998 | Jafri et al. | |
| 5,839,112 A | 11/1998 | Schreitmueller et al. | |
| 5,845,077 A | 12/1998 | Fawcett | |
| 5,862,346 A | 1/1999 | Kley et al. | |
| 5,881,230 A | 3/1999 | Christensen et al. | |
| 5,890,129 A | 3/1999 | Spurgeon | |
| 5,892,905 A | 4/1999 | Brandt et al. | |
| 5,903,873 A | 5/1999 | Peterson et al. | |
| 5,909,581 A | 6/1999 | Park | |
| 5,920,696 A | 7/1999 | Brandt et al. | |
| 5,931,878 A | 8/1999 | Chapin, Jr. | |
| 5,950,169 A | 9/1999 | Borghesi et al. | |
| 5,956,706 A | 9/1999 | Carey et al. | |
| 5,987,423 A | 11/1999 | Arnold et al. | |
| 6,006,148 A | 12/1999 | Strong | |
| 6,016,515 A | 1/2000 | Shaw et al. | |
| 6,029,175 A * | 2/2000 | Chow et al. | |
| 6,049,671 A | 4/2000 | Slivka et al. | |
| 6,073,214 A | 6/2000 | Fawcett | |
| 6,076,066 A | 6/2000 | DiRienzo et al. | |
| 6,088,677 A | 7/2000 | Spurgeon | |
| 6,094,679 A | 7/2000 | Teng et al. | |
| 6,119,149 A | 9/2000 | Notani | |
| 6,122,642 A | 9/2000 | Mehovic | |
| 6,125,384 A | 9/2000 | Brandt et al. | |
| 6,125,391 A | 9/2000 | Meltzer et al. | |
| 6,144,990 A | 11/2000 | Brandt et al. | |
| 6,167,567 A | 12/2000 | Chiles et al. | |
| 6,175,832 B1 | 1/2001 | Luzzi et al. | |
| 6,185,540 B1 | 2/2001 | Schreitmueller et al. | |
| 6,226,675 B1 | 5/2001 | Meltzer et al. | |
| 6,240,365 B1 | 5/2001 | Bunn | |
| 6,263,322 B1 | 7/2001 | Kirkevold et al. | |
| 6,308,120 B1 | 10/2001 | Good | |
| 6,327,617 B1 | 12/2001 | Fawcett | |
| 6,334,146 B1 | 12/2001 | Parasnis et al. | |
| 6,347,398 B1 | 2/2002 | Parthasarathy et al. | |
| 6,360,205 B1 | 3/2002 | Iyengar et al. | |
| 6,381,617 B1 | 4/2002 | Frolund et al. | |
| 6,389,431 B1 | 5/2002 | Frolund et al. | |
| 6,397,191 B1 | 5/2002 | Notani et al. | |
| 6,418,400 B1 | 7/2002 | Webber | |
| 6,418,554 B1 | 7/2002 | Delo et al. | |
| 6,445,309 B1 | 9/2002 | Walker et al. | |
| 6,477,452 B2 | 11/2002 | Good | |
| 6,542,912 B2 | 4/2003 | Meltzer et al. | |
| 6,567,783 B1 | 5/2003 | Notani et al. | |
| 6,594,633 B1 | 7/2003 | Broerman | |
| 6,609,050 B2 | 8/2003 | Li | |
| 6,654,770 B2 | 11/2003 | Kaufman | |
| 6,694,234 B2 | 2/2004 | Lockwood et al. | |
| 6,732,358 B1 | 5/2004 | Siefert | |
| 6,757,698 B2 | 6/2004 | McBride et al. | |
| 6,802,061 B1 | 10/2004 | Parthasarathy et al. | |
| 6,910,040 B2 | 6/2005 | Emmick et al. | |
| 6,965,886 B2 | 11/2005 | Govrin et al. | |
| 6,968,388 B1 | 11/2005 | Fuldseth et al. | |
| 6,976,251 B2 | 12/2005 | Meyerson | |
| 7,020,620 B1 | 3/2006 | Bargnes et al. | |
| 7,062,765 B1 | 6/2006 | Pitzel et al. | |
| 7,089,588 B2 | 8/2006 | Schaefer et al. | |
| 7,275,038 B1 | 9/2007 | Weinstock et al. | |
| 7,324,951 B2 | 1/2008 | Renwick et al. | |
| 7,636,676 B1 | 12/2009 | Wolery et al. | |
| 7,899,690 B1 | 3/2011 | Weinstock et al. | |
| 8,160,906 B2 | 4/2012 | Smith et al. | |
| 8,160,907 B2 | 4/2012 | Smith et al. | |
| 8,374,894 B2 | 2/2013 | Weinstock et al. | |
| 8,401,881 B2 | 3/2013 | Weinstock et al. | |
| 8,412,546 B2 | 4/2013 | Smith et al. | |
| 8,600,783 B2 | 12/2013 | Smith et al. | |
| 8,775,222 B2 | 7/2014 | Smith et al. | |
| 2001/0008998 A1 | 7/2001 | Tamaki et al. | |
| 2001/0027420 A1 | 10/2001 | Boublik et al. | |
| 2001/0027439 A1 | 10/2001 | Holtzman et al. | |
| 2001/0037224 A1 | 11/2001 | Eldridge et al. | |
| 2001/0037298 A1 | 11/2001 | Ehrman et al. | |
| 2001/0044811 A1 | 11/2001 | Ballantyne et al. | |
| 2002/0002478 A1 | 1/2002 | Swart et al. | |
| 2002/0007289 A1 * | 1/2002 | Malin et al. ..................... | 705/4 |
| 2002/0010604 A1 | 1/2002 | Block | |
| 2002/0013767 A1 | 1/2002 | Katz | |
| 2002/0016655 A1 | 2/2002 | Joao | |
| 2002/0019821 A1 | 2/2002 | Rosenbluth | |
| 2002/0026336 A1 | 2/2002 | Eizenburg et al. | |
| 2002/0032626 A1 | 3/2002 | DeWolf et al. | |
| 2002/0032706 A1 | 3/2002 | Perla et al. | |
| 2002/0032790 A1 | 3/2002 | Linderman | |
| 2002/0035488 A1 | 3/2002 | Aquila et al. | |
| 2002/0046301 A1 | 4/2002 | Shannon et al. | |
| 2002/0059345 A1 | 5/2002 | Wang et al. | |
| 2002/0062262 A1 | 5/2002 | Vasconi et al. | |
| 2002/0069123 A1 | 6/2002 | Soderlind et al. | |
| 2002/0073012 A1 | 6/2002 | Lowell et al. | |
| 2002/0082912 A1 | 6/2002 | Batachia et al. | |
| 2002/0087374 A1 | 7/2002 | Boubez et al. | |
| 2002/0091533 A1 | 7/2002 | Ims et al. | |
| 2002/0099575 A1 | 7/2002 | Hubbard et al. | |
| 2002/0099735 A1 | 7/2002 | Schroeder et al. | |
| 2002/0099738 A1 | 7/2002 | Grant | |
| 2002/0111846 A1 | 8/2002 | Singer | |
| 2002/0120776 A1 | 8/2002 | Eggebraaten et al. | |
| 2002/0143644 A1 | 10/2002 | Tosun et al. | |
| 2002/0143819 A1 | 10/2002 | Han et al. | |
| 2002/0156693 A1 | 10/2002 | Stewart et al. | |
| 2002/0169842 A1 | 11/2002 | Christensen et al. | |
| 2002/0177926 A1 | 11/2002 | Lockwood et al. | |
| 2002/0184219 A1 | 12/2002 | Preisig et al. | |
| 2002/0188761 A1 | 12/2002 | Chikirivao et al. | |
| 2002/0198743 A1 | 12/2002 | Ariathurai et al. | |
| 2003/0004746 A1 | 1/2003 | Kheirolomoom et al. | |
| 2003/0005181 A1 | 1/2003 | Bau et al. | |
| 2003/0014295 A1 | 1/2003 | Brookes et al. | |
| 2003/0014442 A1 | 1/2003 | Shiigi et al. | |
| 2003/0014733 A1 | 1/2003 | Ringseth et al. | |
| 2003/0023463 A1 | 1/2003 | Dombroski et al. | |
| 2003/0023957 A1 | 1/2003 | Bau et al. | |
| 2003/0028404 A1 | 2/2003 | Herron et al. | |
| 2003/0028533 A1 | 2/2003 | Bata et al. | |
| 2003/0033369 A1 | 2/2003 | Bernhard | |
| 2003/0050942 A1 | 3/2003 | Ruellan et al. | |
| 2003/0055868 A1 | 3/2003 | Fletcher et al. | |
| 2003/0074423 A1 | 4/2003 | Mayberry et al. | |
| 2003/0093402 A1 | 5/2003 | Upton | |
| 2003/0093403 A1 | 5/2003 | Upton | |
| 2003/0093470 A1 | 5/2003 | Upton | |
| 2003/0093575 A1 | 5/2003 | Upton | |

(56) References Cited

U.S. PATENT DOCUMENTS

| | | |
|---|---|---|
| 2003/0097286 A1 | 5/2003 | Skeen |
| 2003/0101190 A1 | 5/2003 | Horvitz et al. |
| 2003/0110315 A1 | 6/2003 | Upton |
| 2003/0114967 A1 | 6/2003 | Good |
| 2003/0115548 A1 | 6/2003 | Melgar |
| 2003/0115572 A1 | 6/2003 | Zondervan et al. |
| 2003/0120464 A1 | 6/2003 | Taft et al. |
| 2003/0120502 A1 | 6/2003 | Robb et al. |
| 2003/0120665 A1 | 6/2003 | Fox et al. |
| 2003/0125992 A1 | 7/2003 | Rogers et al. |
| 2003/0126063 A1 | 7/2003 | Reuter et al. |
| 2003/0131073 A1 | 7/2003 | Lucovsky et al. |
| 2003/0135584 A1 | 7/2003 | Roberts et al. |
| 2003/0145047 A1 | 7/2003 | Upton |
| 2003/0145067 A1 | 7/2003 | Cover et al. |
| 2003/0154111 A1 | 8/2003 | Dutra et al. |
| 2004/0001575 A1 | 1/2004 | Tang |
| 2004/0054600 A1 | 3/2004 | Shike et al. |
| 2004/0075581 A1 | 4/2004 | Staniszewski |
| 2004/0093134 A1 | 5/2004 | Barber et al. |
| 2004/0107144 A1 | 6/2004 | Short |
| 2004/0172260 A1 | 9/2004 | Junger et al. |
| 2004/0243423 A1 | 12/2004 | Rix et al. |
| 2004/0243619 A1 | 12/2004 | Kelly et al. |
| 2005/0021378 A1 | 1/2005 | Weinstock et al. |
| 2005/0055351 A1 | 3/2005 | Barton et al. |
| 2005/0091087 A1 | 4/2005 | Smith et al. |
| 2005/0125261 A1 | 6/2005 | Adegan |
| 2005/0197866 A1 | 9/2005 | Salcedo et al. |
| 2005/0246206 A1 | 11/2005 | Obora et al. |
| 2006/0031041 A1 | 2/2006 | Afshar et al. |
| 2006/0035692 A1 | 2/2006 | Kirby et al. |
| 2006/0190273 A1 | 8/2006 | Wilbrink et al. |
| 2007/0174081 A1 | 7/2007 | Smith et al. |
| 2007/0203777 A1 | 8/2007 | Berkey et al. |
| 2007/0260496 A1 | 11/2007 | Weinstock et al. |
| 2007/0271124 A1 | 11/2007 | Weinstock et al. |
| 2007/0271125 A1 | 11/2007 | Weinstock et al. |
| 2008/0046261 A1 | 2/2008 | Cunningham |
| 2008/0097798 A1 | 4/2008 | DeVallance et al. |
| 2008/0133281 A1 | 6/2008 | Bolt et al. |
| 2008/0140460 A1 | 6/2008 | Smith et al. |
| 2008/0243562 A1 | 10/2008 | Weinstock et al. |
| 2008/0243563 A1 | 10/2008 | Weinstock et al. |
| 2008/0249814 A1 | 10/2008 | Weinstock et al. |
| 2009/0018859 A1 | 1/2009 | Purifoy et al. |
| 2009/0030747 A1 | 1/2009 | Smith et al. |
| 2010/0023352 A1 | 1/2010 | Smith et al. |
| 2011/0153372 A1 | 6/2011 | Weinstock et al. |
| 2011/0153375 A1 | 6/2011 | Weinstock et al. |
| 2012/0197672 A1 | 8/2012 | Smith et al. |
| 2012/0203580 A1 | 8/2012 | Smith et al. |
| 2012/0203581 A1 | 8/2012 | Smith et al. |
| 2012/0203582 A1 | 8/2012 | Smith et al. |
| 2013/0159033 A1 | 6/2013 | Weinstock et al. |
| 2013/0218614 A1 | 8/2013 | Weinstock et al. |
| 2013/0238373 A1 | 9/2013 | Smith et al. |
| 2013/0246104 A1 | 9/2013 | Weinstock et al. |

FOREIGN PATENT DOCUMENTS

| | | |
|---|---|---|
| WO | 2002067175 A2 | 8/2002 |
| WO | 2002097700 A2 | 12/2002 |
| WO | 2003/067851 A1 | 8/2003 |
| WO | 2008073427 | 6/2008 |

OTHER PUBLICATIONS

"Cieca Estimate Management Standard", Version 2.01, Jun. 19, 2001, 54 pages.

"Rental Management for Vehicle Replacement Rentals", National Electronic Data Interchange Transaction Set Implementation Guide, 272/824, Jul. 2000.

"Rental Management Invoicing and Application Advice for Vehicle Replacement Rentals", National Electronic Data Interchange Transaction Set Implementation Guide, 811/824, Jul. 2000.

"Rental Management Remittance Advice for Vehicle Replacement Rentals", National Electronic Data Interchange Transaction Set Implementation Guide, 820, Jul. 2000.

10K Report; Agency Rent-A-Car Inc.; Report No. 0127651; Section Heading: Part I, Item 1. Business; Jan. 31, 1994; p. 4 of 54.

ARMS Electronic Callback System Demonstration, pp. 1-22, 1998.

Automated Rentals, Unwrapped, pp. 1-7, Oct. 1995.

CarTemps Rent-A-Car; "CarTemps MPOWERENT Management System"; Instruction Manual; Copyright 2000; v1.1; publication date unknown.

CIO Magazine 2002 Enterprise Value Awards Application, pp. 4-10, 2002.

Clip, "Servlets: CGI the Java Way", Byte, May 1, 1998, pp. 55-56, vol. 23, No. 5, McGraw-Hill, Inc., St. Peterborough, US.

Collision Industry Electronic Commerce Association Business Message Specification Schema, Jul. 30, 2003.

Curbera et al., "Unraveling the Web Services Web: An Introduction to SOAP, WSDL, and UDDI", IEEE Internet Computing, Mar. 1, 2002, pp. 86-93, vol. 6, No. 2, IEEE Service Center, New York, NY, US.

Darrah, "Hi-Tech Streamlines Car Rental Process", Feb. 1999, p. 29, vol. 66, Issue 2.

Declaration of William G. Tingle, including Exhibits A-F, filed Jan. 12, 2006 in U.S. Appl. No. 09/641,820.

Enterprise Computer Assisted Rental System Workbook, Sep. 1997.

Enterprise Rent-A-Car ARMS—Vehicle Messaging System, Project Charter, Oct. 15, 1998, pp. 1-7.

Enterprise Rent-A-Car Company ARMS—Vehicle Messaging System Overview, May 16, 2001, p. 1-35.

Enterprise Rent-A-Car Company ARMS—Vehicle Messaging System Phase II Project Charter, Aug. 20, 1999, p. 1-6.

Enterprise Rent-A-Car Company, ARMS Basics and Concepts, vol. 1, Chapter 1-4, Feb. 24, 1998.

Enterprise Rent-A-Car Company, ARMS Basics and Concepts, vol. 1, Chapters 1-4, Jun. 10, 1998.

Enterprise Rent-A-Car Company, Functional Specification, pp. 1-2, Nov. 1999.

Everything You Need to Know About ARMS Automotive, 2000, pp. 1-8.

Fix Auto Collision, EMS Web Agent 1.0, White Paper, Version 1.0, Draft 01, Dec. 9, 2003, pp. 1-18.

Fix Auto, downloaded from https://www.fixauto.com/default.aspx, Sep. 14, 2006, 20 pages.

Graham et al., "Building Web Services with Java?: Making Sense of XML, SOAP, WSDL, and UDDI", Internet Citation, Dec. 12, 2001, Retrieved from the Internet: <URL:http://proquest.safaribooksonline.com/0672321815>.

http://www.eautoclaims.com, pp. 1-11, Apr. 8, 2000.

Interactions, ARMS, vol. 3, No. 6, Mar. 15, 1994.

Interactions, Special Edition, vol. 1, No. 4, Aug. 1992.

Interactions, vol. 1, No. 8, Dec. 1992 38.

Interactions, vol. 2, No. 13, Nov. 1, 1993.

Interactions, vol. 2, No. 14, Nov. 15, 1993.

Interactions, vol. 3, No. 23, Dec. 1, 1994.

Interactions, vol. 4, Issue 16, Aug. 15, 1995.

Interactions, vol. 4, Issue 24, Dec. 15, 1995.

Interactions, vol. 4, No. 3, Feb. 1, 1995.

Interactions, vol. 4, No. 9, May 1, 1995.

Interactions, vol. 5, Issue 13, Oct. 1, 1996.

Interactions, vol. 6, Issue 12, Dec. 1997.

Interactions, vol. 6, Issue 8, Aug. 1997.

Interactions, vol. 7, Issue 12, Dec. 1998.

Interactions, vol. 7, Issue 5, May 1998.

Interactions, vol. 9, Issue 5, May 2000.

International Preliminary Report on Patentability (Chapter I) for PCT/US2007/080607 dated Apr. 7, 2009.

International Search Report and Written Opinion from corresponding PCT/US07/80607 dated Oct. 1, 2008.

Interoffice Memorandum re ARMS Outline, Oct. 7, 1999, pp. 1-2.

(56) References Cited

OTHER PUBLICATIONS

Lorentz, Jeff, Functional Specification, Internet Application Development, ARMS Automotive, pp. 1-3, Jan. 17, 2000.
Milligan, Michael, "OTA targets mid-January to release e-commerce protocol", Travel Weekly, Jan. 10, 2000.
Open Travel Alliance, "ebXML Uses Opentravel Alliance Specification for Early Tests", May 10, 2000.
Open Travel Alliance, "Open Travel Alliance Joins Forces with DISA", Sep. 9, 1999.
Open Travel Alliance, "Open Travel Alliance Names Board Officers", Sep. 2, 1999.
Open Travel Alliance, "OpenTravel Alliance's New XML Specification Creates a Common Customer Profile for Travelers", Feb. 29, 2000.
Open Travel Alliance, "White Paper", pp. 1-20, Feb. 2000.
Rosen, Cheryl, "OTA Debuts Data Protocol", Business Travel News, Jan. 10, 2000.
Rosen, Cheryl, "OTA Publishes XML Data Standard", Business Travel News, pp. 1-2, Mar. 20, 2000.
Travel Agent, "Many Ways to Sell", Oct. 2, 1995, vol. 0, No. 0, p. 36.
TSD Brochure, Rent 2000 from TSD, Rental Management Software, Revolutionize the Way You Do Business with the Proven Proven Solution, p. 1-2.
TSD Brochure, RENT 2000 from TSD, Rental Management Software, Revolutionize the Way You Do Business, p. 1-29.
Wustner et al., "Converting Business Documents: A Classification of Problems and Solutions Using XML/XSLT", Advanced Issues of E-Commerce and Web-Based Information Systems, Jun. 26-28, 2002, Proceedings of the Fourth IEEE International Workshop, Piscataway, NJ, US, IEEE.
U.S. Appl. No. 11/472,168, filed Jun. 21, 2006 (Kelly et al.).
U.S. Appl. No. 60/194,128, filed Apr. 3, 2000 (Aguila).
U.S. Appl. No. 60/527,762, filed Dec. 9, 2003 (Adegan).
U.S. Appl. No. 60/692,886, filed Jun. 21, 2005 (Kelly et al.).
"ARMS Automotive Web Service Process Overview", 8 pages, 2004.
"Communicating Status Updates Just Got Easier", 2 pages, Creation Date of Oct. 26, 2006.
"Enterprise ARMS Your Shop With The Competitive Edge", 2 pages, Creation Date of Oct. 2007.
"Fix Auto WEB-CMS Repair Delay Form", 3 pages, 2004.
"Work flow for estimate written at repair facility populating the ARMS(r) automotive application, using CynCast Data Pump", 1 page, Aug. 29, 2007.
Office Action for U.S. Appl. No. 12/179,071 dated May 26, 2011.
"What Is Windows Communication Foundation?", downloaded from http://msdn.microsoft.com/en-us/library/ms731082(printer).aspx on Aug. 27, 2008, 6 pages.
Office Action for CA Application No. 2416840 dated Jan. 7, 2005.
Office Action for CA Application No. 2416840 dated Mar. 5, 2010.
Office Action for EP Application No. 01273072.7 dated Apr. 11, 2004.
Office Action for U.S. Appl. No. 10/865,116 dated Oct. 28, 2010.
Office Action for U.S. Appl. No. 11/747,645 dated Aug. 27, 2010.
Office Action for U.S. Appl. No. 11/823,782 dated Feb. 17, 2011.
Office Action for U.S. Appl. No. 11/823,782 dated May 27, 2010.
Office Action for U.S. Appl. No. 11/929,277 dated Oct. 12, 2010.
Office Action for U.S. Appl. No. 11/929,350 dated Feb. 7, 2011.
Office Action for U.S. Appl. No. 11/929,473 dated Oct. 12, 2010.
Office Action for U.S. Appl. No. 12/178,037 dated Nov. 17, 2010.
Prosecution History for U.S. Appl. No. 09/641,820, now U.S. Pat. No. 7,275,038, filed Aug. 18, 2000 (as of Apr. 20, 2011).
Prosecution History for U.S. Appl. No. 09/694,050, now U.S. Pat. No. 7,899,690, filed Oct. 20, 2000—Part 1 (as of Apr. 20, 2011).
Prosecution History for U.S. Appl. No. 09/694,050, now U.S. Pat. No. 7,899,690, filed Oct. 20, 2000—Part 2 (as of Apr. 20, 2011).
Prosecution History for U.S. Appl. No. 09/694,050, now U.S. Pat. No. 7,899,690, filed Oct. 20, 2000—Part 3 (as of Apr. 20, 2011).
Prosecution History for U.S. Appl. No. 10/343,576, filed Jan. 31, 2003—Part 1 (as of Apr. 20, 2011).
Prosecution History for U.S. Appl. No. 10/343,576, filed Jan. 31, 2003—Part 2 (as of Apr. 20, 2011).
Prosecution History for U.S. Appl. No. 10/343,576, filed Jan. 31, 2003—Part 3 (as of Apr. 20, 2011).
Prosecution History for U.S. Appl. No. 11/609,844, filed Dec. 12, 2006 (as of Apr. 20, 2011).
Prosecution History for U.S. Appl. No. 12/179,071, filed Jul. 24, 2008 (as of Apr. 20, 2011).
Response to Office Action for CA Application 2416840 dated Jul. 7, 2005.
Response to Office Action for CA Application 2416840 dated Sep. 3, 2010.
Response to Office Action for EP Application No. 01273072.7 dated Aug. 30, 2005.
Response to Office Action for U.S. Appl. No. 11/747,645 dated Aug. 27, 2010.
Response to Office Action for U.S. Appl. No. 11/929,277 dated Oct. 12, 2010.
Notice of Allowance for U.S. Appl. No. 13/025,546 dated Jun. 25, 2012.
Office Action for U.S. Appl. No. 12/178,037 dated Nov. 26, 2012.
Office Action for U.S. Appl. No. 13/447,821 dated Oct. 11, 2012.
"Thrifty Introduces Automated Car Rental Centers", PRNEWSWIRE, Jul. 20, 1994.
Office Action for CA Application No. 2664941 dated Jan. 16, 2012.
Office Action for U.S. Appl. No. 12/178,037 dated Jul. 29, 2011.
Office Action for U.S. Appl. No. 13/025,617 dated Apr. 27, 2012.
Prosecution History for U.S. Appl. No. 11/550,614, filed Oct. 18, 2006 (as of Jun. 14, 2012).
Prosecution History for U.S. Appl. No. 11/747,645, filed May 11, 2007 (as of Jun. 14, 2012).
Prosecution History for U.S. Appl. No. 11/823,782, filed Jun. 28, 2007—Parts 1-5 (as of Jun. 14, 2012).
Prosecution History for U.S. Appl. No. 11/881,216, filed Jul. 26, 2007—Parts 1-5 (as of Jun. 14, 2012).
Prosecution History for U.S. Appl. No. 11/881,383, filed Jul. 26, 2007—Parts 1-5 (as of Jun. 14, 2012).
Prosecution History for U.S. Appl. No. 11/929,277, filed Oct. 30, 2007—Parts 1-5 (as of Jun. 14, 2012).
Prosecution History for U.S. Appl. No. 11/929,350, filed Oct. 30, 2007—Parts 1-5 (as of Jun. 14, 2012).
Saha, "Application Framework for e-business: Portals", Internet Citation, Nov. 1999, XP002276158, Retrieved from the Internet: URL: ftp://www6.software.ibm.com/software/developer/library/portals.pdf, Retrieved on Apr. 5, 2004.
Schlosser, "IBM Application Framework for e-business: Security", Internet Citation, Nov. 1999, XP002257288, Retrieved from the Internet: URL:ftp://www6.software.ibm.com/software/developer/library/security.pdf, Retrieved on Sep. 12, 1999.
"Automatic Backups with Rsync", Internet, Dec. 31, 2005, http://web.archive.org/web/20060819145215/http://www.tux.org/~tbr/rsync/rsynchowto.html.
Office Action for CA Application 2664941 dated Jan. 30, 2015.
Office Action for CA Application 2664941 dated Apr. 11, 2016.
"EMS Data Pump for SQL Servers", Internet, Oct. 3, 2006, http://web.archive.org/web/20061003221224/http://sqlmanager.net/en/products/mssqul/datapump.
"RSYNC", Internet, Sep. 1, 2006, http://web.archive.org/web20060901022931/http://www.ss64.com/bash/rsync.html.
Office Action for CA Application 2664941 dated Oct. 31, 2013.

* cited by examiner

```
Start:

If starting from previous shutdown
        Pre-populate file table
End if

For each file in directory x
If file is not locked
        If file not in table
                Copy file to inbox
                Update file in table
        Else if file in table and file time later than table file time
                Copy file to inbox
                Update file in table
        End if
End if If a change occurred
        Trigger scanner event
End if While sleep period has not ended
        Sleep [interval]
While end Loop Start
```

Figure 6

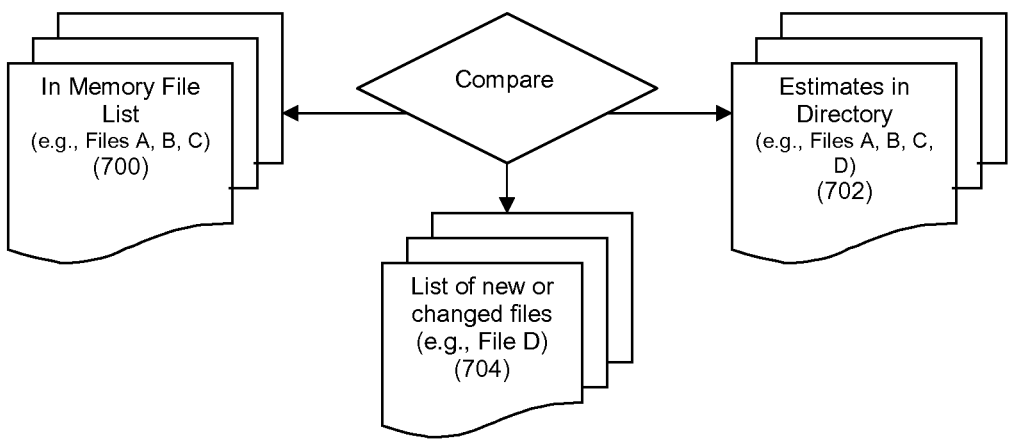

Figure 7

```
Start:

For each envelope file in inbox
        If directory envelope name does not exist
                Create envelope directory using envelope name
        End if Add envelope file to directory override any previous file
    Add all files belonging to envelope
    If envelope directory estimates validation is true
            Create a zip package
            Place in outbox
            Delete directory and files
    End if
End For If a change occurred
        Signal upload manager
End if Perform a re-sort of file in case a file arrived while processing Wait for signal
End Wait Loop Start
```

Figure 8

10/2/06 1:51 PM  S – Direct Bill Authorization set at 100%
10/2/06 1:51 PM  S – Test
S=Sent, R=Received, N=Note To Self
*All times are in CST ◀ Top Of Page

Invoicing: [Printer Friendly Page]   ☐ Print Rental History too
Use the "Print" button from you rbrowser after clicking the "Printer Friendly Page" button.

RENTAL INFORMATION:
Enterprise Rent-A-Car Location:
ENTERPRISE RENT-A-CAR (PPGM)
8850 TESTE ROAD
LATEST ADDRESS LINE 2 2/12/04
ST. LOUIS, MO
(314) 212-7000

BILLING DETAIL:
Authorized:
Policy Daily Rate/
Maximum Dollars:  15.00/450.00
Days:
Rate:                        $15.00
Direct Bill Percent:         100%
Total Authorized:            $30.00*
*Does not include taxes and surcharges

INVOICE:
Invoice Number: D2018l3-PPGM
Invoice Date:

Actual Rental:
Rental Period: 10/01/06 to 10/2/06 (2 days)
Billed Period: to  (days)
Actual Days:

ADDITIONAL CLAIM INFORMATION:
Renter: ROTHE148PM, RUPALI1002
Claim Number: 5203829058902590235B/02980290 2932
Vehicle Condition: Non-Driveable Direct Bill Percent:         100%
Total Charges:               $0.00
Amount Received:             $0.00
Total Amount Due:            $0.00

Date of Loss:
Insured Name:  Claim Type: Insured

[<< Previous]

◀ Top Of Page

Contact Us | Terms and Conditions | Sign Out

Figure 17(c)

METHOD AND SYSTEM FOR COMMUNICATING VEHICLE REPAIR INFORMATION TO A BUSINESS-TO-BUSINESS RENTAL VEHICLE RESERVATION MANAGEMENT COMPUTER SYSTEM

CROSS-REFERENCE AND PRIORITY CLAIM TO RELATED PATENT APPLICATIONS

This application claims priority to provisional patent application 60/828,540, entitled "Method and System for Communicating Vehicle Repair Information to a Business-to-Business Rental Vehicle Reservation Management Computer System", filed Oct. 6, 2006, the entire disclosure of which is incorporated herein by reference.

This application is also related to the following two pending U.S. patent applications: (1) U.S. patent application Ser. No. 10/865,116, filed Jun. 10, 2004, published as U.S. patent application publication 2005/0091087 and entitled "Business to Business Computer System for Communicating and Processing Rental Car Reservations Using Web Services", and (2) U.S. patent application Ser. No. 11/472,168, filed Jun. 21, 2006, and entitled "Collision Repair Estimate Information Exchange Methodology", the entire disclosures of both of which are incorporated herein by reference.

FIELD OF THE INVENTION

The present invention generally relates to systems and methods for exchanging information amongst organizations. More particularly, the present invention relates to systems and methods for exchanging vehicle repair information between repair shops, rental car companies, and insurance companies.

BACKGROUND AND SUMMARY OF THE INVENTION

Vehicle repair shops/facilities that are engaged in the collision repair industry repair damaged automobiles which have been involved in an accident. Such vehicle repair shops typically obtain their business (i.e., automobiles to repair) from a number of sources, including insurance companies, automobile dealerships, automobile fleet accounts and walk-in customers, with insurance companies being the primary source for such business.

When an insured is involved in an accident that causes physical damage to the insured's automobile, the insured then contacts the insurance company to report the accident and "file a claim" on his/her vehicle insurance policy. The insured is then given a claim number, and the date of loss is recorded, typically in a computer database operated by the insurance company. The claim number can be used as a unique identifier for referencing to that particular claim with the insurance company. If the insurance company has an established automobile repair program (typically referred to as a direct repair program (DRP)) as part of its automobile physical claims (APC) process, the claim is assigned or dispatched to a designated DRP collision repair shop.

The claim is typically assigned by an insurance company to a repair shop electronically over the Internet or by fax. Upon receipt of the assignment, the collision repair shop typically calls the customer to schedule an appointment for the customer to drop off the car at the shop's premises for repair. Thereafter, a shop employee, typically an estimator, generates a cost estimate for the repair. To generate this estimate, many repair shops use a software application known as an estimating system. The estimating system can then export the estimate into a standardized file set, such as the CIECA EMS format discussed herein and known in the art. These standardized estimates can be communicated (often electronically via the Internet) to the insurance company for review and approval. If the review process reveals a problem with the estimate (e.g., the manual labor rate is not the same as an agreed upon rate with the insurance company), the estimate can be re-sent to the collision repair shop for further refinement. This can be an iterative process which continues until the estimate passes review. Upon approval of the estimate by the insurance company, the repair shop then generates a repair order (RO), which is a detailed invoice and a legal agreement between the repair shop and the insured concerning the repair of the vehicle. Once the insured agrees to the repairs set out in the repair order (typically via a signed authorization), the repair shop begins the repair of the damaged vehicle in accordance with the repair order.

Because the insured will be without an automobile during repairs, the insurance policy will often cover the expenses for a rental vehicle during that time. In this regard, the time of the repair, or cycle time, is an important estimate metric for minimizing claim costs to the insurance company. Therefore, the repair shop typically must specify a target delivery date to the insurance company, as well as the rental company and the insured, wherein this target delivery date identifies when the repair shop predicts that the repairs will be completed (and the customer can thus begin driving the repaired car again). This target delivery date can then be used as an initial benchmark for setting the period of authorization for a replacement rental vehicle. For example, if the repair shop forecasts that it will take 3 days to complete repairs of the customer's damaged vehicle, then the insurance company can choose to authorize a rental vehicle for the customer for a period of 3 days. If there is a delay in the repair and the initial rental period must be extended, then the repair shop revises the target delivery date and communicates it back to the insurance company and the rental company. The system involved in supporting this functionality is commonly known in the art as Target Date Management and Vehicle Status, which is part of a repair facility's body shop management system (BSMS), the BSMS being a software application used by repair facilities to manage their repair orders (ROs). With knowledge of a new and later estimated date of completion, insurance companies can be provided with an opportunity to decide whether to extend the authorization period of the customer's rental vehicle.

Historically, large volumes of telephone calls had to be placed among the employees of the insurance companies, repair shops and rental vehicle companies to coordinate the repair and rental process for customers with damaged vehicles, with redundant data entries being made in the respective companies computer systems as a result of information learned during the telephone calls. To aid in alleviating the burden of these telephone calls and the attendant data entry redundancies, one pioneering development in the industry has been a business-to-business rental vehicle reservations management system operated by Enterprise Rent-A-Car and known as the ARMS® system (hereinafter the "ARMS system"). With the ARMS system, an authorized business partner of a rental vehicle company (e.g., an insurance adjuster) not only can create rental vehicle reservations with a rental vehicle company but can also manage those reservations, all while using his/her Internet-connected computer. The following patent applications, the entire disclosures of each of which are incorporated herein by reference, describe various aspects and embodiments of the ARMS system in greater detail: (1) U.S. patent application Ser. No. 09/641,820, filed Aug. 18, 2000, now U.S. Pat. No. 7,275,038, (2) U.S. patent application Ser. No. 09/694,050, filed Oct. 20, 2000, (3) U.S. patent application Ser. No. 10/028,073, filed Dec. 26, 2001, and published as U.S. patent application publication 2003/0125992, (4) U.S. patent application Ser. No. 10/343,576, filed Jan. 31, 2003 (which is a national phase of PCT patent application serial number PCT/US01/51437, filed Oct. 19, 2001), and published as U.S. patent application publication 2005/0021378, and (5) the above-referenced U.S. patent application Ser. No. 10/865,116, filed Jun. 10, 2004.

Accordingly, in this environment, a need in the art exists for increasing the automation of sharing data amongst the players in the collision repair industry (particularly insurance companies, repair shops and rental car companies). More specifically, a need exists for automating the process by which the rental vehicle reservation management system receives data, particularly vehicle repair data corresponding to the vehicles that are undergoing repairs while an insured or claimant has rented an insurance replacement rental vehicle.

To address this need in the art, the inventors herein disclose, in accordance with one aspect of the invention, a system for communicating vehicle repair data among a plurality of parties, the system comprising: (a) a first computer system associated with a repair facility, and (b) a second computer system, wherein the repair facility computer system is in communication with the second computer system over a network, wherein the repair facility computer system has vehicle repair data stored thereon, the vehicle repair data comprising labor hours estimation data that comprises an estimate as to how many labor hours are needed to complete repairs to at least one vehicle undergoing repair at the repair facility, wherein the repair facility computer system is configured to execute a software application, and wherein the software application is configured to (1) automatically retrieve vehicle repair data that is stored by the repair facility computer system without human intervention, the retrieved vehicle repair data including labor hours estimation data, and (2) automatically send the retrieved vehicle repair data including the retrieved labor hours estimation data to the second computer system over the network without human intervention.

The inventors also disclose a computer-implemented method for communicating vehicle repair data among a plurality of parties, the method comprising executing a software application on a repair facility computer system, the repair facility computer system having vehicle repair data stored thereon, the vehicle repair data comprising labor hours estimation data that comprises an estimate as to how many labor hours are needed to complete repairs to at least one vehicle undergoing repair at the repair facility, and wherein the software application executing step comprises (1) automatically retrieving vehicle repair data that is stored by the repair facility computer system without human intervention, the retrieved vehicle repair data including labor hours estimation data, and (2) automatically sending the retrieved vehicle repair data including the retrieved labor hours estimation data to a second computer system over a network without human intervention.

According to another aspect of the invention, the inventors herein disclose a computer-readable medium for execution by a processor, the computer-readable medium comprising a plurality of instructions that are executable by a processor to (1) automatically retrieve vehicle repair data that is stored by a first computer system without human intervention, the retrieved vehicle repair data comprising labor hours estimation data that comprises an estimate as to how many labor hours are needed to complete repairs to at least one vehicle undergoing repair, and (2) automatically send the retrieved vehicle repair data including the labor hours estimation data to a second computer system over a network without human intervention, wherein the plurality of instructions are stored on the computer-readable medium.

As used herein, the terms "vehicle repair information" and "vehicle repair data" refer to any data relating to the process of repairing a vehicle, including data corresponding to a vehicle repair estimate and/or a vehicle repair order. As noted, this software application, which can be termed a "data pump", is configured to automatically retrieve the vehicle repair data from the repair facility computer and automatically send the retrieved repair data to the data server without human intervention. However, it should be noted that it is the retrieval operation and the sending operation which are performed automatically without human intervention. It should be noted that human intervention may optionally be used to install the data pump onto the repair facility computer system.

The vehicle repair data may take a variety of forms, including repair estimate data and/or repair order data as explained above. The pump is preferably configured to not only retrieve and transmit new data files with repair estimates and/or repair orders, but also updates to existing repair estimate/repair order data files.

The data server is preferably configured to communicate at least a portion of the repair data to a rental vehicle reservation management system operated by the rental car company (such as the ARMS system). The rental vehicle reservation management system can then store this data in its database and thereafter make the repair data available to its business partners, such as insurance adjusters who access the rental vehicle reservation management system to manage insurance replacement rental vehicle reservations. Through this communication technique, the flow of repair data from the repair facility to the insurance adjuster can be completely automated (once it has been entered once into the repair facility via the repair facility's software application(s) for creating and managing repair estimates and repair orders). Thus, repair facility personnel need only enter vehicle repair data into their computer systems as they normally would in the course of business, and the data pump software application will operate to automatically extract that existing vehicle repair data from the repair facility computer system for transmission over a network to interested parties, all without intervention on the part of repair facility personnel.

By providing the insurance adjuster with repair estimate data such as labor hours estimation data in accordance with the embodiments of the invention described herein, at least three advantages accrue to the insurance adjuster. First, insurance adjusters are provided with the ability to access the repair estimate information without needing to place a telephone call to the repair facility. Further still, this access to repair estimate information can be provided to the insurance adjuster in an automatic and transparent manner such that the insurance adjuster need only access the ARMS system as he/she would normally do in the course of managing a replacement rental vehicle reservation to view and review the pertinent repair estimate data after it has already been matched to a particular replacement rental vehicle that the adjuster is managing. Second, by delivering the automated flow of vehicle repair data to insurance adjusters through the reservation management computer system (rather than through a different computer system), the insurance adjuster need only access a single application to learn of the information needed to properly manage a replacement rental vehicle reservation. Third, by promptly attaining the repair estimate information such as the labor hours estimation data in the manner described herein, an insurance adjuster is provided with the ability to make a more accurate and timely forecasts (particularly for an initial forecast) as to the appropriate length of time for which a replacement rental vehicle should be authorized. The labor hours estimation data is an important indicator of how long a driver will need a replacement rental vehicle while his/her vehicle is undergoing repair. After the initial authorization period for a replacement rental vehicle has been decided by the adjuster, the adjuster can then use the repair information (and/or updates thereto) available to him/her through the embodiments of the invention described herein to revise the authorization period for the replacement rental vehicle as needed (e.g., extending the authorization period to accommodate a delay in the repair process).

According to yet another aspect of the present invention, the inventors herein disclose a computer-implemented method of providing personnel of a business partner of a rental vehicle service provider with access to vehicle repair data, the method comprising: (a) automatically retrieving labor hours estimation data from a repair facility computer system without human intervention, the labor hours estimation data corresponding to at least one replacement rental vehicle reservation and comprising an estimate as to how many labor hours are needed to complete repairs to at least one vehicle undergoing repair at a repair facility, (b) automatically uploading the retrieved labor hours estimation data to a data server without human intervention, (c) communicating the labor hours estimation data to a reservation management computer system, wherein the reservation management computer system is configured for access over a network by a business partner computer to thereby provide a personnel of the business partner with an ability to create and manage a plurality of replacement rental vehicle reservations, and (d) providing the business partner computer with access to the communicated labor hours estimation data through the reservation management computer system.

According to still another aspect of the present invention, the inventors herein disclose a computer-implemented method of providing personnel of a business partner of a rental vehicle service provider with access to vehicle repair data, the method comprising: (a) automatically retrieving labor hours estimation data from a repair facility computer system without human intervention, the labor hours estimation data corresponding to at least one replacement rental vehicle reservation and comprising an estimate as to how many labor hours are needed to complete repairs to at least one vehicle undergoing repair at a repair facility, (b) automatically uploading the retrieved labor hours estimation data to a reservation management computer system, wherein the reservation management computer system is configured for access over a network by a business partner computer to thereby provide a personnel of the business partner with an ability to create and manage a plurality of replacement rental vehicle reservations, and (c) providing the business partner computer with access to the uploaded labor hours estimation data through the reservation management computer system.

According to yet another aspect of the present invention, the inventors herein disclose a computer-implemented method for automating the communication of vehicle repair data, the method comprising: (a) accessing a server on which a software application is stored, (b) downloading the software application to the first computer system, (c) installing the downloaded software application on the first computer system, and (d) automatically executing the installed software application on the first computer system without human intervention, wherein the executing step comprises: (1) automatically retrieving vehicle repair data that is stored by the first computer system without human intervention, and (2) automatically sending the retrieved vehicle repair data to a second computer system over a network without human intervention.

According to still another aspect of the present invention, the inventors disclose a computer-implemented method comprising: (a) providing a software application for download over a network to a first computer system on which vehicle repair data is stored, the software application being configured to (1) automatically retrieve vehicle repair data that is stored by the first computer system without human intervention, and (2) automatically send the retrieved vehicle repair data to a second computer system over a network without human intervention, (b) receiving a download request from a requesting computer system, and (c) responsive to the receiving step, downloading the software application to the requesting computer system over the network.

These and other features and advantages of the present invention will be apparent to those having ordinary skill in the art upon a review of the disclosure herein.

BRIEF DESCRIPTION OF THE DRAWINGS

FIG. 6 depicts exemplary pseudo-code for a discoverer/watcher component of the estimate data pump shown in FIG. 5;

FIG. 7 depicts an exemplary compare process performed by a discoverer/watcher component of the estimate data pump shown in FIG. 5;

FIG. 8 depicts exemplary pseudo-code for a scanner component of the estimate data pump shown in FIG. 5;

FIGS. 17(a)-(c) depict an exemplary graphical user interface (GUI) screen provided by the rental vehicle reservation management system, wherein vehicle repair information obtained from a repair facility is displayed; and FIG. 18 is a block diagram overview that depicts an exemplary embodiment of how the repair order data pump can integrate with a body shop management system using a plug-in.

DETAILED DESCRIPTION OF THE PREFERRED EMBODIMENT

As generally explained in the background hereinbefore, the typical players in the collision repair market include an insurer or insurance company, an insured, a repair shop, and a car rental company. The present invention provides a method for processing collision repair estimate information between such players, as the exchange of such information is essential for most, if not all, processes involved with collision repair.

Figure 1:
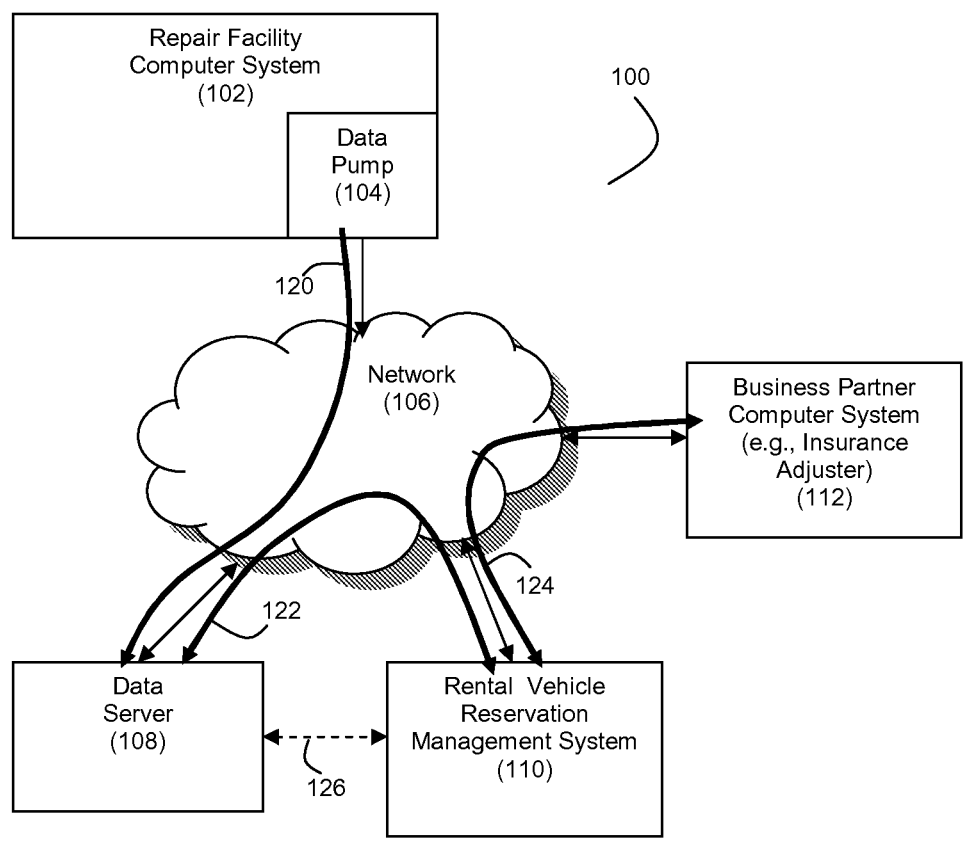
FIG. 1 depicts an exemplary system in accordance with a preferred embodiment of the present invention.

FIG. 1 depicts an exemplary system 100 in accordance with a preferred embodiment of the present invention. The system 100 preferably comprises a repair facility computer system 102 operated by a repair facility, a data server 108 configured as a data center, a rental vehicle reservation management system 110 operated by a rental car company, and a computer system 112 operated by a business partner of the rental car company and/or the repair facility, all of which preferably being interconnected via a communications network 106 (preferably the Internet).

A data pump 104 installed on the repair facility computer system 102 is a software application that is configured to automatically communicate vehicle repair information to the data server 108 via network 106 (see data path 120). The vehicle repair information that is sent via path 120 preferably comprises repair estimate information and/or repair order (RO) information (preferably including updates to estimate and/or RO information). The pump 104 is configured to extract already existing pertinent vehicle repair information from the file directories of the repair facility computer systems 102 in which that information is stored, thereby alleviating the need of repair shop personnel to re-enter the vehicle repair information into a separate application after they have already entered it once into the repair facility computer system's existing applications for managing estimates and/or ROs. That is, pump 104 is configured for automatic execution by the repair facility computer system 102 without human intervention to extract vehicle repair information from the repair facility's computer system transparently from the perspective of repair shop personnel while requiring repair shop personnel to only enter the vehicle repair information once into their computers through existing estimate/RO management software.

The data server 108 serves as a data repository for the vehicle repair information sent thereto from the repair facility computer system 102. Preferably, the data server 108 also provides data processing services on the data stored thereby, as explained below. It is worth noting that in the system 100 of the preferred embodiment, a plurality of repair facility computer systems 102 (and their resident data pumps 104) will be present and connected to network 106. As such, the data server 108 is preferably configured to receive vehicle repair information from multiple disparate repair facility computer systems 102.

Data server 108 is also configured to communicate the vehicle repair information stored thereon to the rental vehicle reservation management system 110 via path 122. The vehicle repair information that is communicated along data path 122 can be a subset of the vehicle repair information sent to the data server along path 120. It should be noted that data server 108 may encompass one or more data servers. An example of a suitable hardware environment for data server 108 are Dell 2650 servers with Intel Xeon processors, the server being configured to store data in an EMC Clarion disk array. However, it should be appreciated that data server 108 could be readily realized with different hardware.

As explained in greater detail below, the rental vehicle reservation management system 110 is configured to provide a user of the business partner computer system 112 with the ability to remotely create and manage rental vehicle reservations with the rental car company as if that user were himself/herself an employee of the rental car company.

The business partner computer system 112 can be the computer system of an insurance company. As additional examples, computer system 112 can also be operated by business partners such as automobile dealers and vehicle fleet companies. In such instances, when an insured driver of a vehicle becomes involved in an accident that results in damage to either or both of the insured's and another party's vehicle (the another party being a "claimant"), the insurance company will typically assign a repair facility with the task of repairing the damaged vehicle(s) and obtaining a replacement rental vehicle for the insured (and/or claimant) while the insured's (and/or claimant's) ordinary vehicle is undergoing repairs. To create and manage such rental vehicle reservations, the business partner computer system 112 communicates with the rental vehicle reservation management system 110 via data path 124.

It is important for the insurance company to track both the progress of a vehicle repair and the number of days that have been authorized for renting the replacement rental vehicle, thereby helping the insurance company contain costs when satisfying claims. That is, it is desirable for the insurance company to have the number of days authorized for a rental vehicle under the insurance policy match the number of days it takes to complete repairs to the insured's/claimant's ordinary vehicle. If it were to take a repair facility only 3 days to repair a rental vehicle, but the insurance company has authorized 5 days for a rental vehicle, then the insurance company may be placed in the position of unnecessarily paying for 2 days of a rental car.

To provide insurance company personnel (such as insurance adjusters) with this useful information, the rental vehicle reservation management system 110 is preferably configured to store the vehicle repair information that it receives from data server 108 (or information derived therefrom) and make it available to the insurance company computer system 112 via data path 124. Armed with this information, insurance adjusters will be able to more efficiently manage the processing of insurance claims.

To increase the automation of data flow in system 100, the data pump is configured to retrieve and upload vehicle repair information to the data server without human intervention. Similarly, it also preferred that the data server 108 be configured to automatically upload vehicle repair information to the rental vehicle reservation management system 110 without human intervention.

Although not shown in FIG. 1, it should be noted that the APC process also typically includes electronic communications from an insurance company computer system to the repair facility computer system 102 (often by way of an information provider such as CCC, Mitchell or other vendors in the industry), whereby a repair facility is asked to prepare an estimate for repairing a damaged vehicle.

Figure 2A:
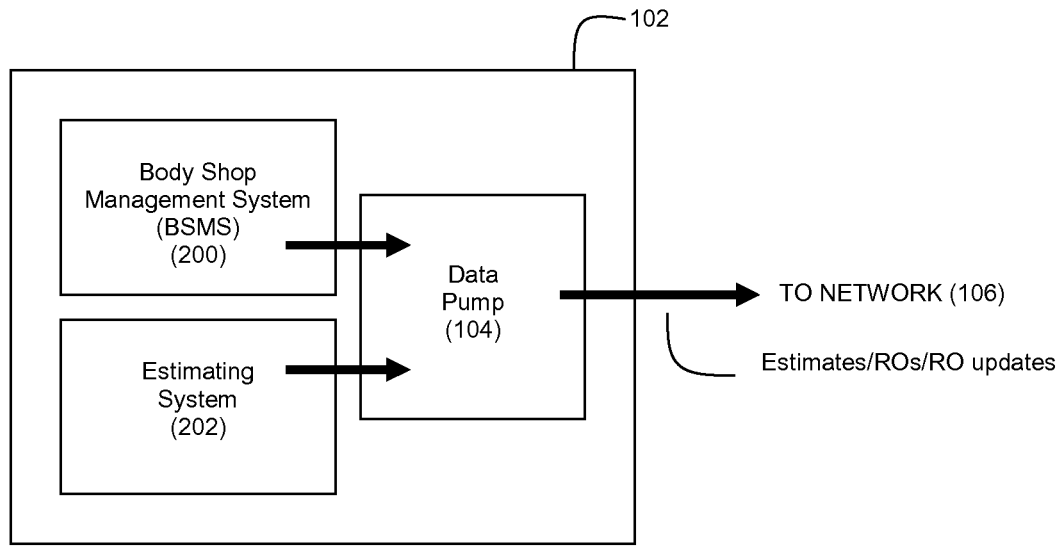
FIGS. 2(a)-(d) depict exemplary repair facility computer systems in accordance with various embodiments of the present invention.

FIG. 2(a)-(d) depict various exemplary embodiments of the repair facility computer system 102 that could be used in the practice of the present invention. The repair facility computer system 102 typically includes the standard computer components of a CPU, RAM, hard disk drive(s), input devices (e.g., keyboard and mouse), and a display screen. FIG. 2(a) depicts a software environment for such a system 102, wherein the system 102 is configured with a BSMS software application 200 for managing repair orders (ROs) and an estimating system software application 202 for managing repair estimates. Both the BSMS system 200 and the estimating system 202 can be standard commercially available software applications. For example, the three major estimating systems available in the art are provided by the companies ADP, CCC, and Mitchell. Furthermore, there are approximately 10-12 major vendors of BSMS systems.

Repair shop personnel can access the estimating system 202 in standard ways known in the art to generate a repair estimate for repairing a damaged vehicle. Preferably, the result of this process is a standardized set of files that comply with a standard in the art known as the Estimate Management Standard (EMS). The EMS format is set forth by the Collision Industry Electronic Commerce Association (CIECA), which is a non-profit organization that has promulgated data interchange standards for players in the collision repair industry. The preferred EMS format is that defined by CIECA in the CIECA Estimate Management Standard Version 2.01 (or Version 2.6 or other versions as they become available), the entire disclosures of which are incorporated herein by reference. With the EMS, each estimate is embodied by a set of files which will be collectively referred to herein as an "EMS file". This EMS file is preferably stored on the repair facility computer system 102. Among a multitude of other data fields, EMS files include data fields that identify the estimated total labor hours and total costs that a repair facility believes are necessary to complete repairs of a damaged vehicle as well as data fields that identify the customer/driver whose vehicle is to be repaired, the repair facility where the vehicle is to be repaired, and the insurance information pertinent to that vehicle.

After an estimate is approved by an insurance adjuster (possibly after refinements thereof), a repair order for repairing the damaged vehicle is generated. To do so, repair facility personnel can access the BSMS system 200. Among the multitude of data fields that are present in an RO file are fields that identify a target completion date for completing repairs of the damaged vehicle and a current repair status for the damaged vehicle. It is expected that as a vehicle repair progresses, the RO file will be periodically updated to refine the target completion date (e.g., a forecast of 3 days is changed to 5 days if unexpected delays occur (such as a part taking longer than expected to arrive at the repair facility) or a forecast of 4 days being changed to 2 days because of repairs being performed ahead of schedule) and/or refine the vehicle repair status. At the current time, there is not a common standardized format for ROs as there is for estimates. Of the 10-12 commonly-used BSMS systems, most store RO data in a database of the BSMS using relational database techniques, such as ISAM database storage techniques and SQL database storage techniques.

Figure 2B:
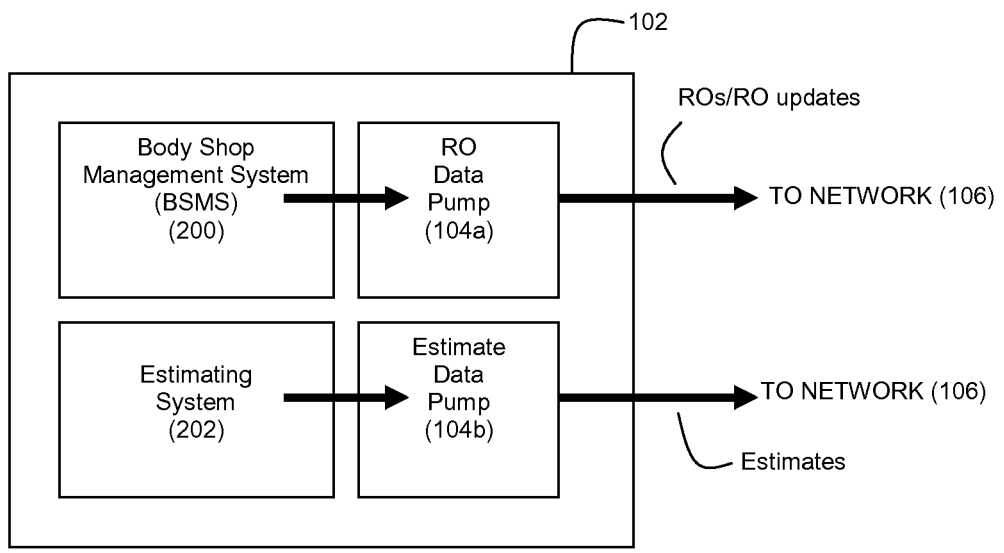

As shown in FIGS. 1 and 2(a)-(d), a data pump 104 is preferably installed on the repair facility computer system 102. The data pump 104 is preferably a software agent that is configured to retrieve repair estimate data and RO data from the file system/database of the repair facility computer system, and upload the retrieved data to the data server 108. The data pump 104 can be configured to integrate with both the BSMS system 200 and EMS system 202 as shown in FIG. 2(a). Alternatively, data pump 104 can be configured as an RO data pump 104a that integrates with the BSMS system 200 to retrieve and upload RO data and as an estimate data pump 104b that integrates with the estimating system 202 to retrieve and upload estimate data, as shown in FIG. 2(b).

Figure 2C:
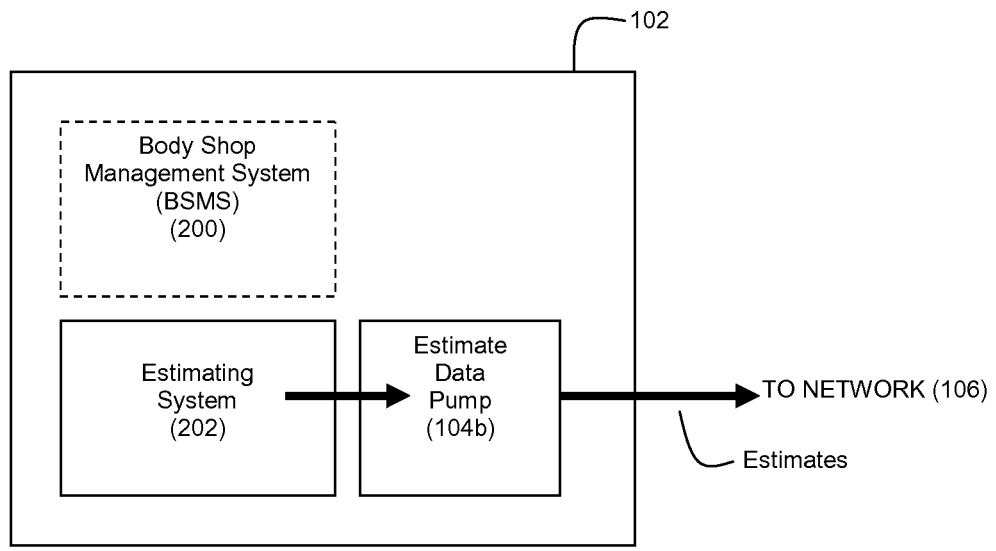
Figure 2D:
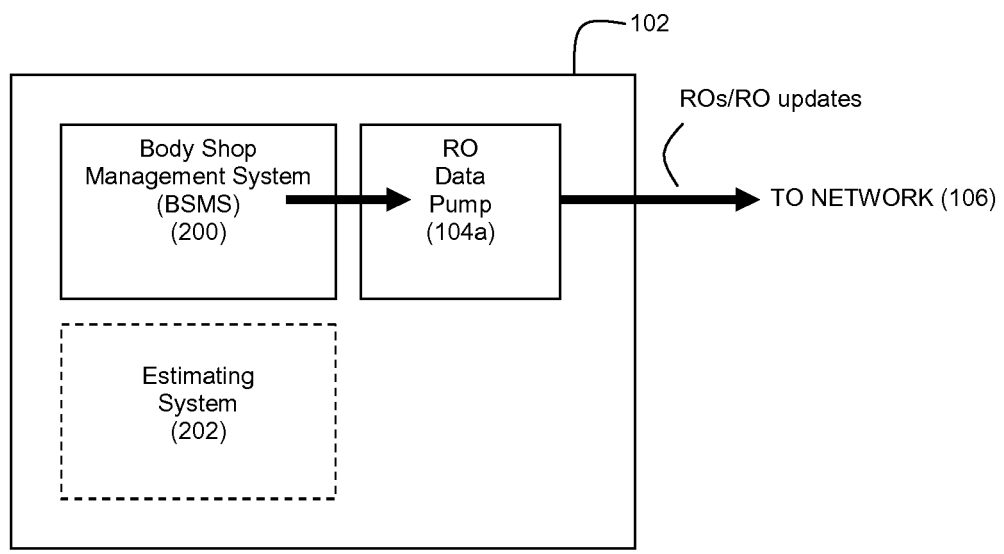

Further still, for a repair facility computer system 102 that either has chosen not to upload RO data or does not have a BSMS system, FIG. 2(c) depicts an embodiment of a repair facility computer system 102 wherein only an estimate data pump 104b is installed. Similarly, FIG. 2(d) depicts an embodiment of a repair facility computer system 102 wherein only a RO data pump 104a has been installed (either because that repair facility does not have an estimating system 202 or that repair facility has an estimating system 202 but does not upload estimate data to the data server 108).

Figure 3:
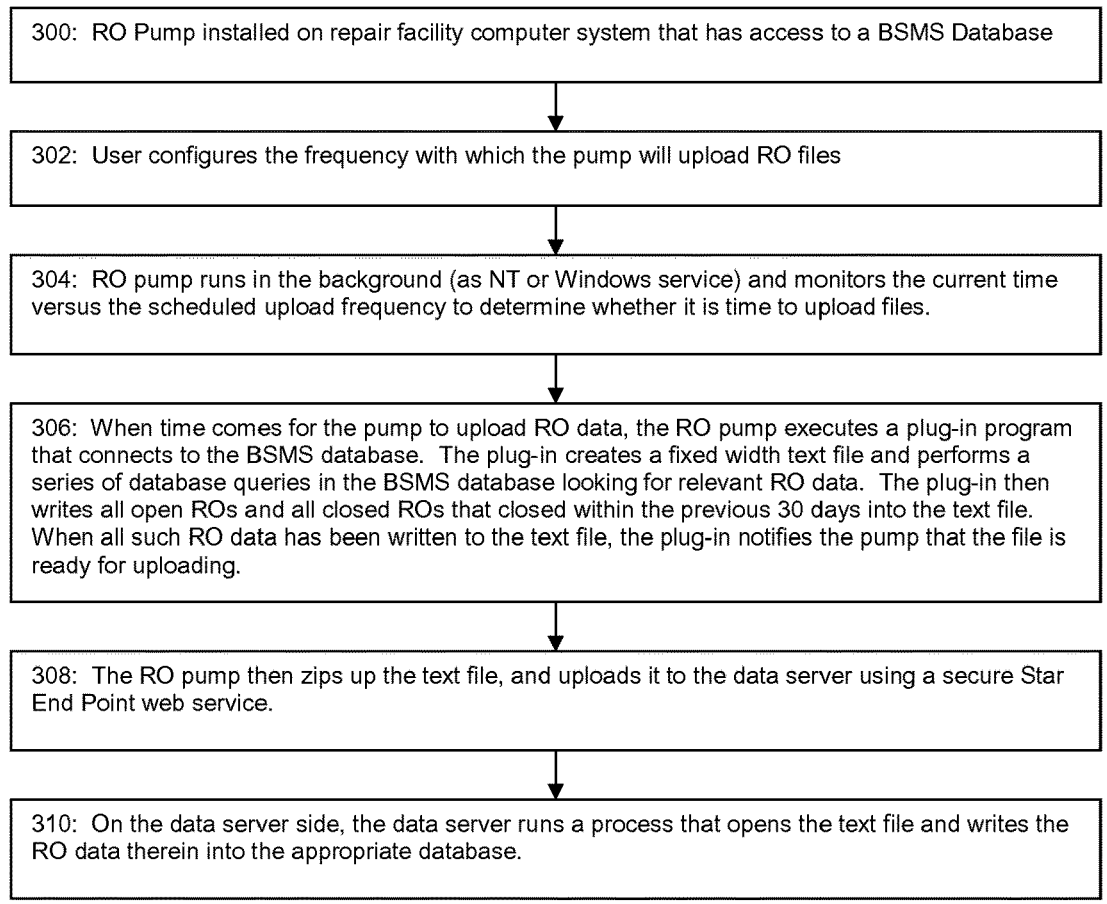
FIG. 3 is a flowchart that describes the installation and operation of a preferred repair order data pump.
Figure 15:
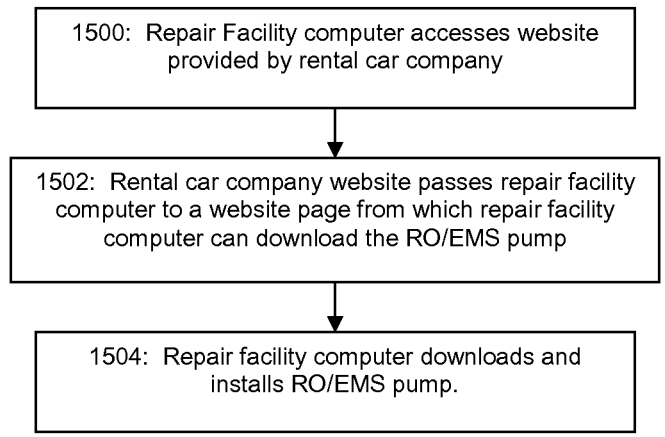
FIG. 15 is a flowchart that describes a preferred process for downloading data pumps to repair facility computer systems.

FIG. 3 depicts an exemplary process flow for the installation and operation of an RO data pump 104a on a repair facility computer system 102. RO pump 104a is preferably configured to extract relevant RO data from the BSMS database at scheduled intervals and transmit the extracted RO data to the data server. At step 300, the data pump 104a is installed on a repair facility computer system 102, preferably one that has access to a BSMS database, as shown in connection with FIGS. 2(a), (b) and (d). Preferably, step 300 is performed by downloading the RO data pump 104a from a remote server via network 106. FIG. 15 depicts a preferred flow for this downloading process. At step 1500, the repair facility computer system 102 accesses a website maintained by the rental car company. A preferred example of such a website would be the ARMS/Automotive® website operated by Enterprise Rent-A-Car. Thereafter, at step 1502, the rental car company website passes the repair facility computer system to a website page hosted by a provider of the data pump (for example, the operator of the data server 108 can serve as the data pump provider; although this need not be the case). From this page, a user of the repair facility computer system can preferably download the data pump 104 to the repair facility computer system 102 for installation thereon (step 1504). Alternatively, the repair facility computer system user can download the data pump directly from the website of the data pump provider. Further still, the data pump 104 could be installed onto the repair facility computer system 102 from a CD-ROM or other external media provided to the repair facility. It should also be noted that the pump can be configured with an auto-updating feature such that the pump will automatically download any updates thereto from website of the data pump provider should an updated version of the data pump become available.

Returning to FIG. 3, following installation of the data pump on repair facility computer system, at step 302, a user of the repair facility computer system 102 can optionally configure the frequency with which the pump 104a will upload estimate and RO data to the data server. However, it should be noted that the pump 104a can be configured with a default frequency with which it retrieves and uploads estimate and RO data, thereby alleviating the need of the user to interact with the pump at step 302. Thereafter, the pump 104*a* runs in the background of the repair facility computer system (preferably as an NT/Windows service), and the pump monitors the current time versus its scheduled upload frequency to thereby determine whether it is time to retrieve and upload data to the data server (step 304).

Figure 18:
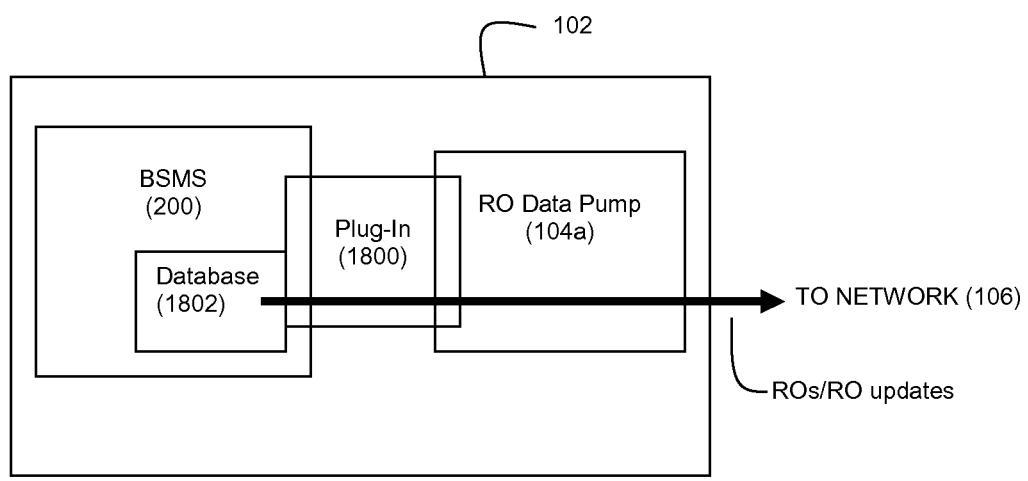

At step 306, when the time arrives for the pump 104*a* to upload RO data, the pump 104*a* preferably executes a program provided by the BSMS. This program is referred to as a "plug-in" to the pump 104*a*. This plug-in is preferably the Repair Order Extract plug-in that is available from CynCast of Anaheim Hills, Calif. or from Value Added Resellers (VARs), for inclusion with the BSMS systems available from VARs such as Mitchell, ADP, and the like. As shown in FIG. 18, the plug-in 1800 connects to the database 1802 of the repair facility computer system 102 and creates a fixed width ASCII text file that contains the data for all open RO files stored in the BSMS database 1802 as well as the data for all RO files stored in the BSMS database 1802 that have been closed within a predetermined number of previous days (e.g., the last 30 days of closed RO files). To retrieve this data, the plug-in 1800 is preferably configured to query the BSMS database for the RO data fields of interest. Preferably, this text file is configured such that each line of the text file corresponds to a different RO, and wherein a select subset of the data fields of a given RO are written on a given line in a standardized format. Among the data fields that are included for each RO line are a target completion date for completing repairs to the damaged vehicle and a vehicle repair status for that vehicle (as well as identifying data for the driver/customer whose vehicle is being repaired, for the repair facility, and for the relevant insurance claim). When the plug-in is finished creating the fixed width text file and writing the retrieved RO data thereto, control is returned to the pump 104*a*, wherein the file is ready for processing and upload.

Next, at step 308, the pump 104*a* zips up the text file and uploads the zipped text file to the data server 108 using a secure web service (e.g., the Star End Point web service as defined by the Star standards organization commonly used in the automobile dealership industry). Then, at step 310, a server side process on the data server 108 preferably opens the text file and writes the RO data into an appropriate database on the server 108.

Figure 4:
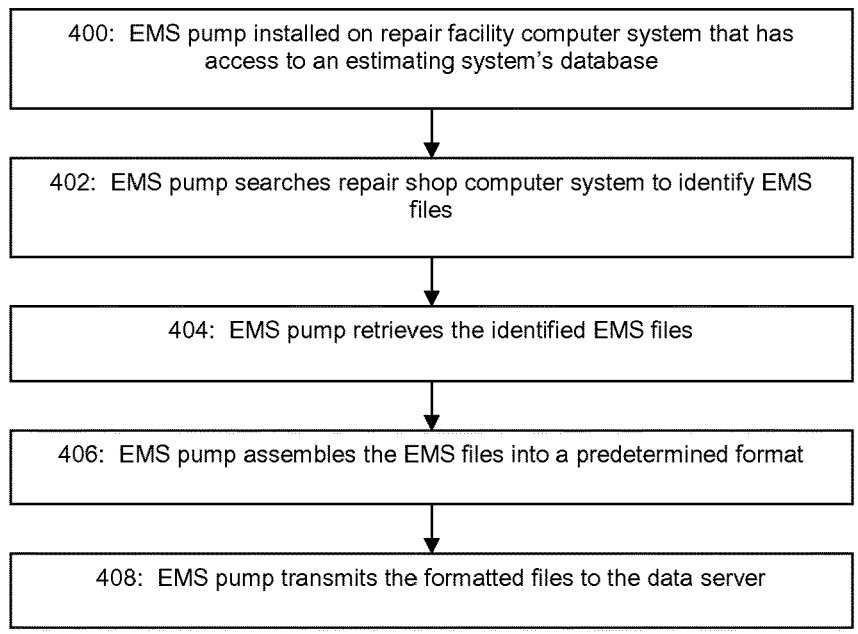
FIG. 4 is a flowchart that describes the installation and operation of a preferred estimate data pump.

FIG. 4 depicts an exemplary process flow for the installation and operation of an EMS data pump 104*b* on a repair facility computer system 102. EMS pump 104*b* is preferably configured to extract relevant EMS files from the estimating system's database in either or both of two modes: an events mode or a scheduled mode, as explained below. At step 400, the data pump 104*b* is installed on a repair facility computer system 102, preferably one that has access to an estimating system database, as shown in connection with FIGS. 2(*a*)-(*c*). Preferably, step 400 is performed by downloading the EMS data pump 104*b* from a remote server via network 106 as shown in connection with FIG. 15. At step 402, the pump 104*b* searches the repair facility computer system 102 to identify the estimate data for uploading (preferably in the form of EMS files). The pump 104*b* is preferably configured to search an appropriate file directory of the estimating system to find new or changed EMS files, wherein the appropriate file directory can be defined as a configurable parameter for the pump 104*b* based on what type of estimating system platform is used by the repair facility. The searching file path for locating EMS files is preferably defined during installation of the pump 104*b* on the repair facility computer system 102 and then built into the pump's configuration file. At step 404, the pump 104 retrieves the identified EMS files from the file system of the repair facility computer system 102. At step 406, the pump 104*b* then assembles the retrieved EMS files into a predetermined format for uploading to the data server 108 via a web service (step 408). Preferably the pump creates a folder for each estimate, and then stores each file in that estimate's EMS file set in the folder for that estimate.

Figure 5:
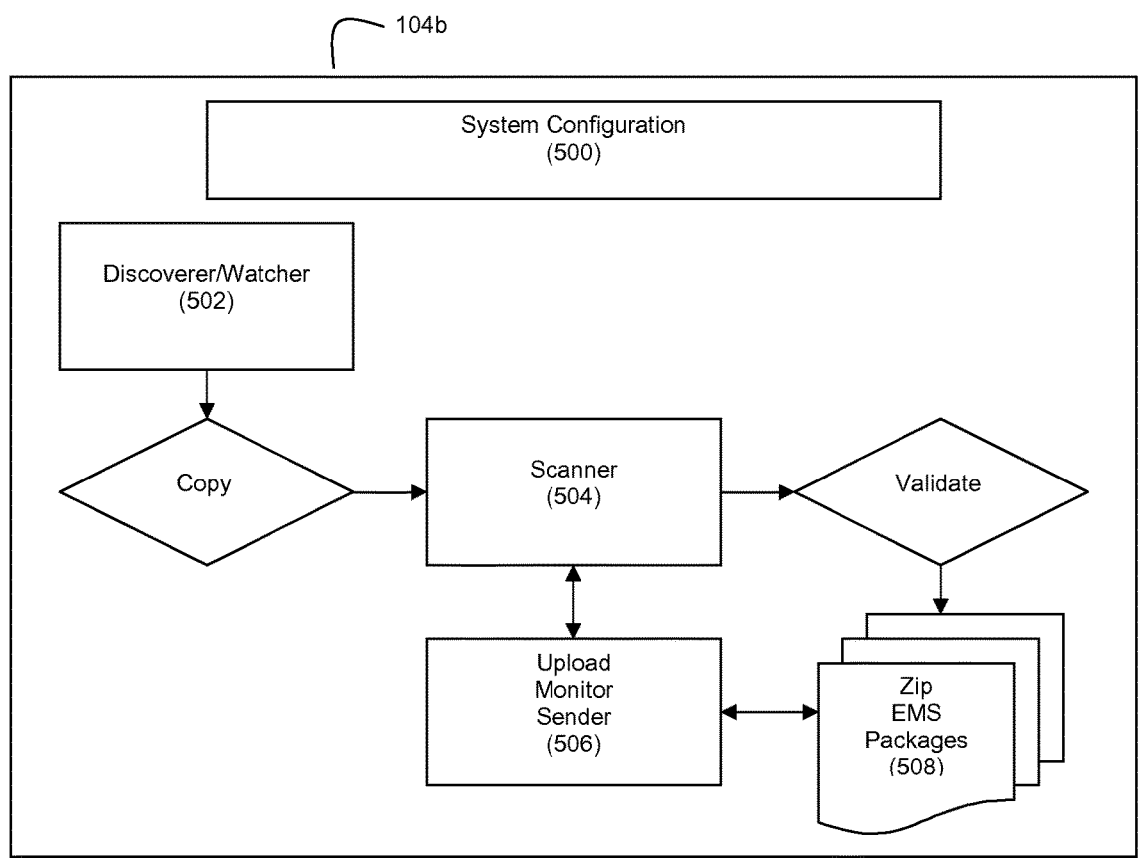
FIG. 5 is a block diagram overview of a preferred estimate data pump.

FIG. 5 depicts a preferred software architecture for the EMS data pump 104*b*. The code for pump 104*b* is preferably written using object-oriented c++ and the Standard Template Library (STL). The STL library is preferably based on the latest release version, using Visual Studio. However, as should be understood by those having ordinary skill in the art, alternative programming languages could be used. Furthermore, the pump code also preferably uses the Windows 32 Application Programming Interface (API).

Pump 104*b* preferably comprises a system configuration component 500, a discoverer/watcher component 502, a scanner component 504, and an upload monitor/sender component 506. Together these components operate to retrieve EMS data from the repair facility computer system and upload them to the data server, preferably in the form of zipped EMS packages 508.

The discover/watcher 502 can be configured in either or both of two modes: an event mode and a polling mode. When in an event mode, the watcher 502 is configured to watch one or more specified file directories in the estimating system to look for new or changed EMS files. Upon detection of a new or changed EMS file, the watcher 502 then begins the pumping process of FIG. 4 (steps 404, 406, and 408). The event mode can be implemented in any of several ways. For example, the WIN32 API provides for a notification API, which triggers when a change occurs in the directory of interest. As such, if the underlying operating system of the repair facility computer system 102 supports the WIN32 Notification API, the pump 104*b* could also be designed to include that API as a configurable option. However, the watcher 502 can also or alternatively be configured with a polling mechanism for polling the one or more estimating system file directories to determine whether a new or changed EMS file has been written thereto. It is believed by the inventors herein that the event mode will provide for more "real time" performance of the data pump 104*b* such that the latency between the time of EMS file creation/modification and the time of EMS file upload to the data server will be reduced relative to that of the polling mode. Thus, the discoverer/watcher 502 watches the provider directory for changes and/or new additions in the estimate data stored on repair facility computer system. FIG. 6 depicts exemplary pseudo-code for the discoverer/watcher 502. As can be seen, upon discovering a new/changed EMS file, the watcher 502 copies that file to an inbox directory and notifies the scanner 504 of the copied file.

It should be noted that an EMS file is not copied when the file is locked. The locking of a file usually means that the file is either being written to or has been placed in an exclusive mode by the operating system because it is being processed. The watcher 502 preferably ignores these files altogether to avoid contention with the estimating system and with the underlying operating system.

The file table 700 maintained by the watcher 502 is preferably an STL Hash Map that contains the name of each EMS file and the date/time that each EMS file was last processed. The watcher 502 preferably synchronizes the file table against the files 702 copied to the inbox directory on each traversal of the local database, as shown in FIG. 7, with the output of the comparison being a list 704 of new or changed EMS files. Thus, if the files previously known to the watcher 502 in file list 700 are files A, B and C, but a scan of the file system results in files A, B, C and D being copied to inbox directory 702, then the comparison process will result in the conclusion that File D is a new EMS file not previously encountered by the pump (as shown on list 704).

The scanner 504 is preferably configured to organize and validate EMS files. The scanner 502 is notified of changes to EMS files by listening for events generated by the watcher 502. The scanner 504 preferably scans the inbox directory in order to categorize and validate the EMS files uncovered by the watcher 502 on list 704. It should be remembered that each EMS file is actually a set of standardized files. To validate whether the EMS file includes all of the files in its set, the scanner 504 preferably accesses a validation table that lists all of the files that should be included in the EMS files of the major three estimating system platforms. If the validation succeeds, the scanner 504 preferably creates a zipped package of the validated EMS files and places the zipped package in an outbox folder for uploading thereof by the upload monitor/sender 506. To create the zip packages 508, the scanner preferably uses a Saarch.dll file, which is an available COM library capable of creating the packages 508 in a PKZip format. Exemplary pseudo-code for scanner 504 is shown in FIG. 8.

Preferably, only a single scanner 504 runs for the instance of the application. When the scanner 504 notifies the upload monitor 506, the scanner 504 preferably remains in a waiting state until the watcher 502 triggers the next change event.

The scanner 504 preferably categorizes the contents of the inbox directory by parsing the file names therein and matching each file to its parent "ENV" (or envelope file). The envelope file will always be available from all three major estimating systems. The scanner 504 preferably categorizes the files by an estimate identifier and by an estimate type to thereby identify both the particular repair estimate and the platform on which it was generated.

The upload monitor/sender 506 is configured to upload zipped packages 508 to the data server 108, preferably using a web service that encapsulates the zipped package(s) 508 in a SOAP envelope. Upload monitor 506 preferably runs in both a signaled state and an interval state, to thereby ensure that any packaged files 508 in the outbox are always delivered. The monitor 506 preferably scans the outbox looking for a ".zip" package and a corresponding base64 text file (both of which are preferably provided by the scanner). The monitor 506 then preferably uploads any files found in the outbox. If the monitor 506 experiences more than a predetermined number of consecutive errors (e.g., more than 5 consecutive errors), it will preferably halt sending any packages until the next signal to wait period has elapsed.

When a package is transmitted, the monitor 506 preferably invokes the send on a different thread of execution, this thread using a Web Service Utility program. This web service preferably uses the available MSXML 4.0 component, which is used for the SOAP-based interaction and the TCP/IP Socket functionality of the web service calls. If MSXML is not already installed on the repair facility computer system 102, it can be added using the Windows Installer Package scheme during installation of the pump. The Web Service Utility preferably attempts to deliver the package for up to a predetermined amount of time (e.g., 5 minutes) unless an error occurs. When the timeout is reached, the Web Service Utility preferably logs an error and releases any of its resources. Upon successful upload, the Web Service Utility preferably deletes the zip package 508 and corresponding base64 text stream and shuts down.

The system configuration component 500 defines several configurable parameters that control the pump's manner of operation. Among the configurable parameters are a heart beat or ping schedule for allowing the data server to recognize that the pump is operational. The heart beat or ping is preferably invoked when the pump has been idle for more than a specified amount of time. Also configurable are the identifications of the directories in which the EMS files are stored on the repair facility computer system 102. Typically, these directories are also defined on a per vendor basis (e.g., the directory where ADP files would be found, where CCC files would be found and where Mitchell files would be found). Thus, the pump 104*b* preferably uses a configuration file that defines the file directories where EMS files can be found with each of the major 3 estimating system platforms. It should also be noted that the pump 104*b* can be configured to automatically select which file directories within the configuration file it will use in response to user input at the time of installation, wherein this user input defines which estimating system platform that is used by the repair facility. The user can provide such input through an install wizard that could be included in the process flow of FIG. 15. Examples of additional configuration settings are the name, email, phone number, computer system type and other identifying data for the repair facility in which the pump 104*b* is installed.

The data pump 104*b* preferably uses a factory-based pattern for the creation and subsequent destruction of all core-based objects. The manager factory preferably exposes itself as a singleton capable of managing the lifetime scope of each object from the created worker objects. Each provider is preferably encapsulated and owns a reference to the factory. The factory is preferably initialized and instantiated upon invocation of the pump. An event listener pattern is preferably used to notify objects of changes, which provides the ability for each first class object to receive "messages" or notifications of changes and triggers in the system. For instance, when the watcher 502 completes a cycle and finds a change, the watcher 502 notifies the scanner 504 for that provider that a change has occurred, thereby allowing the scanner 504 to be efficient in that it will only be invoked upon a signal from the watcher 502. The pattern is preferably accomplished by extensive use of shareable interfaces.

A singleton at the system level preferably manages all configuration settings. The configuration object is preferably available as a static object that is initialized at first invocation. The system level configuration object preferably manages all logging and system resources.

Because c++ does not inherently provide for the management of a thread of execution (as provided by, for example, Java or C#), a thread management object is preferably created to facilitate the use of threads. The threads are preferably created by inheriting from an abstract base class, which provides for the implementation of a run method. The thread cycle is preferably managed by the thread object and ensures that the thread lifecycle completes and/or throws an appropriate error when an exceptional condition occurs. It should also be noted that the pump 104*b* is preferably configured such that the NT/Windows service is automatically stopped upon detection by the pump of an authentication error on the data server 108, thereby automatically stopping operation of the pump 104*b*.

Figures 9A, 9B:
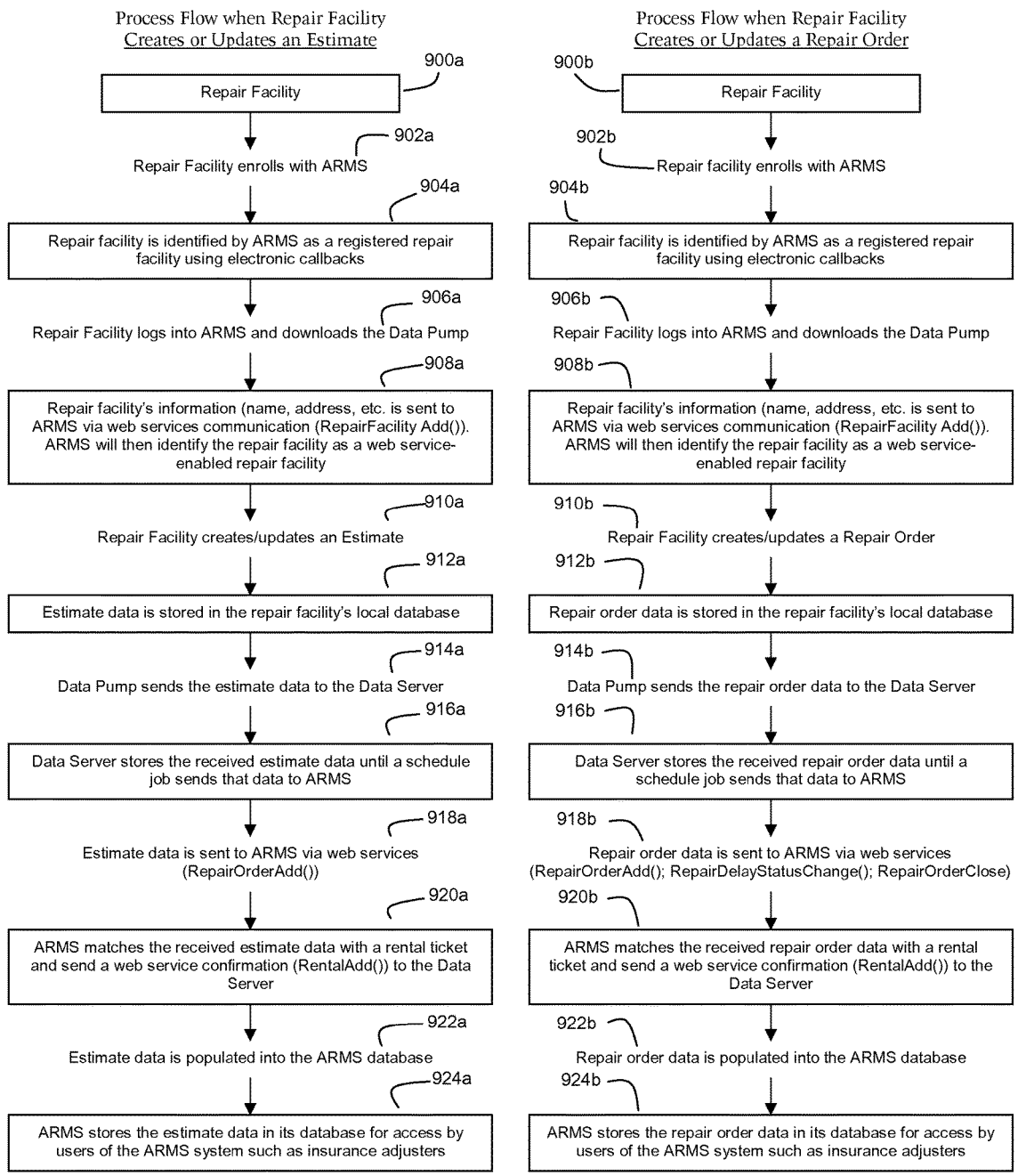
FIGS. 9(a) and (b) depict exemplary process flows that occur within the preferred system as a repair facility creates or updates RO/EMS files.

FIGS. 9(*a*) and 9(*b*) depict exemplary process flows that occur in system 100 upon the creation of a new RO/EMS file or the updating of an existing RO/EMS file. FIG. 9(a) corresponds to the process flow encountered upon the creating/updating of an EMS file, while FIG. 9(b) corresponds to the process flow encountered upon the creating/updating of an RO file. As can be seen, both flows are largely identical albeit with the different underlying pumping mechanisms as described in connection with FIGS. 3-8.

Figure 10:
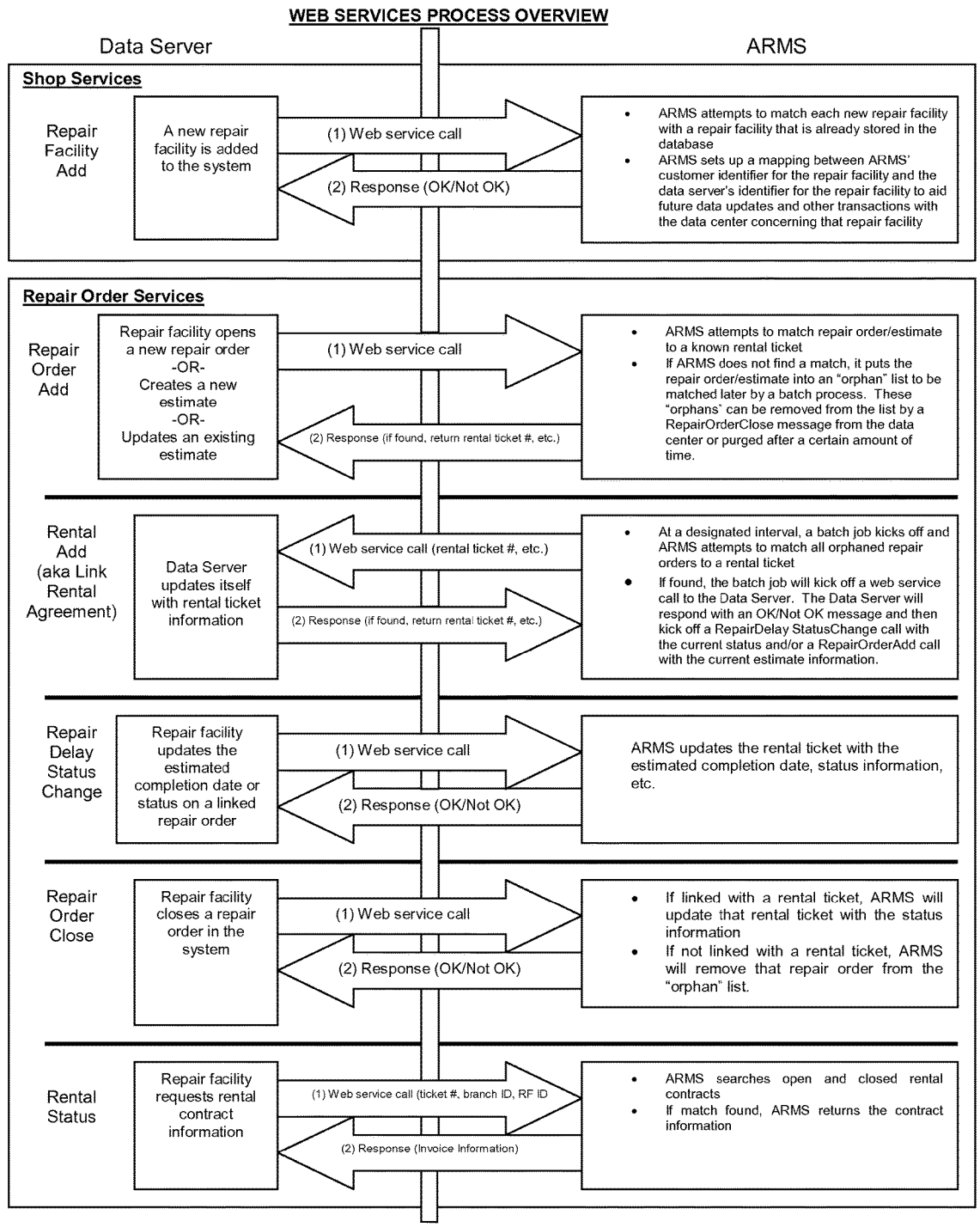
FIG. 10 depicts an exemplary web service process overview for messaging between the data server and the rental vehicle reservation management system.

At step 902, the repair facility 900 registers itself with the rental vehicle reservation management system 100 (preferably the ARMS system operated by Enterprise Rent-A-Car). Upon such enrollment, the repair facility is identified by the ARMS system using some form of identifier for the repair facility (step 904). Thereafter, the repair facility logs into the ARMS system and accesses a website available through the ARMS system to download the data pump 104 to its computer system 102 (step 906; see FIG. 15). Next, at step 908, the repair facility's information (name, address, etc.) is sent to the ARMS system (by way of data server 108) using an XML-based web services communication (preferably the RepairFacilityAdd( ) web service as shown in FIG. 10). This message preferably includes an identifier for the repair facility that is used by data server 108.

As shown in FIG. 10, upon receipt of the Repair Facility Add web service message, the ARMS system 110 attempts to match the new repair facility with a repair facility that is already stored in the ARMS database. If a match is found, the ARMS re-uses the existing repair facility identifier it already has stored for that repair facility (which preferably has already been created after steps 902 and 904). The ARMS system 110 then sets up a mapping between the repair facility identifier used by ARMS and the repair facility identifier used by the data server 108, thereby aiding future data transactions with the data server concerning that repair facility. Following step 908, the repair facility is identified by the ARMS system as a web service-enabled repair facility.

At step 910, a user of the repair facility computer system 102 creates or updates an RO/EMS file, and this created/updated RO/EMS file is stored in the repair facility's local database (step 912). At this time, the data pump 104 operates to automatically retrieve the new/updated RO/EMS file and upload it to the data server as previously described in connection with FIGS. 3-8.

At step 916, the data server 108 then stores the uploaded RO/EMS file. Upon receipt of the RO/EMS data, the data server 108 queues that data for further processing. Data server 108 is preferably configured with a variety of business rules for processing and formatting the uploaded RO/EMS data. For example, the data server 108 is preferably configured to cleanse the RO/EMS data such that any data formatting inconsistencies between the data fields of the different estimating or BSMS platforms is resolved, thereby resulting in the data server 108 storing commonly formatted data (e.g., using a common date format such as mm/dd/yy for the target completion date). Furthermore, data server 108 can be configured to process received RO data to determine whether any changes have occurred with respect to an RO's target completion date or vehicle repair status. If a change in such data is detected, then the data server can cause the updated RO data to be communicated to the rental vehicle reservation management system 110 as described herein. Preferably, the data server 108 is also configured with a job scheduler that controls when the data server communicates the RO/EMS file to the ARMS system 110. Upon initiation by the job scheduler, the data server 108 then communicates the RO/EMS files to the ARMS system 110 using XML-based web services (preferably the Repair Order Add web service shown in FIG. 10). As an example, the job scheduler can run a batch process every two hours that sends the queued RO/EMS data destined for the ARMS system 110 to the ARMS system 110. As shown in FIG. 10, the Repair Order Add web service is triggered by a user of the repair facility computer system opening a new RO, creating a new EMS, or updating an existing EMS (while updates to ROs preferably trigger the Repair Delay Status Change web service also shown in FIG. 10). Upon such events, the data server will receive the relevant RO/EMS file and forward it to the ARMS system 110 using a web service call.

Upon receipt of the Repair Order Add web service call, the ARMS system 110 then runs a matching process against the received RO/EMS file in an attempt to match the RO/EMS file to an existing rental ticket (step 920). A rental ticket will likely already exist in the ARMS system for a rental vehicle picked up by an insured or claimant; however, this will not always be the case. If the ARMS system is unable to pair the RO/EMS file with a rental ticket, then an identifier for that RO/EMS file is stored in an "orphans" list maintained by the ARMS system. The ARMS system will periodically run the matching process against the RO/EMS files on the orphans lists in an attempt to pair those files with rental tickets (wherein a rental ticket may have been opened for the insured/claimant since the time the matching process was last run against those RO/EMS files). Orphans can preferably be removed from the list by a Repair Order Close web service call received from the data server for that RO/EMS file, or they can be purged from the list after some predetermined amount of time (e.g., 30 days, 90 days, or some other length of time) The matching process employed by the ARMS system 110 preferably operates by looking for matches between select fields of RO/EMS data and rental ticket data; these fields being preferably hierarchically arranged. For example, one matching metric that could be used would first filter the RO/EMS data and rental ticket data based on which repair facility is associated with the RO/EMS data and rental ticket, then secondly filter the RO/EMS data and rental ticket data based on the last name of the renter/person whose vehicle is undergoing repairs, and then thirdly filter the RO/EMS data and rental ticket data based on which insurance companies are associated with the RO/EMS data and rental tickets.

As a response to the Repair Order Add web service call, the ARMS system 110 preferably sends a responsive web service message back to the data server. If a matching rental ticket has been found for the RO/EMS file, this responsive message preferably includes a rental ticket identifier (e.g., rental ticket number) for the rental corresponding to the RO/EMS. The data server 108 can then update itself with the rental ticket information by associating that RO/EMS file with the rental ticket identifier. By doing so, as subsequent updates to that RO/EMS file are made and received by the data server 108, when the data server sends subsequent web service messages to the ARMS system corresponding to updates to those RO/EMS files, then the data server can also send the rental ticket identifier as part of the web service message, thereby alleviating the ARMS system of the need to perform the matching process.

FIG. 10 also illustrates a Rental Add (aka Link Rental Agreement) web service exchange corresponding to this aspect of the process, triggered in this case by the ARMS system finding a paired rental ticket for an RO/EMS file on the orphans list. A scheduler on the ARMS system 110 preferably controls when the matching process is run against the orphan RO/EMS files on the orphans list.

At step 922, the RO/EMS data (or some subset of the RO/EMS data) is populated into the ARMS database. Preferably, the RO/EMS data that is stored by the ARMS system are the following fields: (1) from EMS data, the estimated labor hours and the estimated labor cost, and (2) from RO data, the vehicle's repair status and target completion date for vehicle repairs. Furthermore, preferably the data is accompanied by a document type identifier that serves to flag whether the data is for an estimate or for a RO. This flag can be useful for informing the ARMS system whether a Repair Order Close web service will be needed (whereas estimates preferably do not need such a "close" order). However, it should be noted that more or less data could be stored by the ARMS system. For example, the ARMS system could be configured to store the EMS and RO data in their entireties. As another example, the ARMS system could be configured to store only the estimated labor hours and the estimated completion date for vehicle repairs.

Figure 17A:
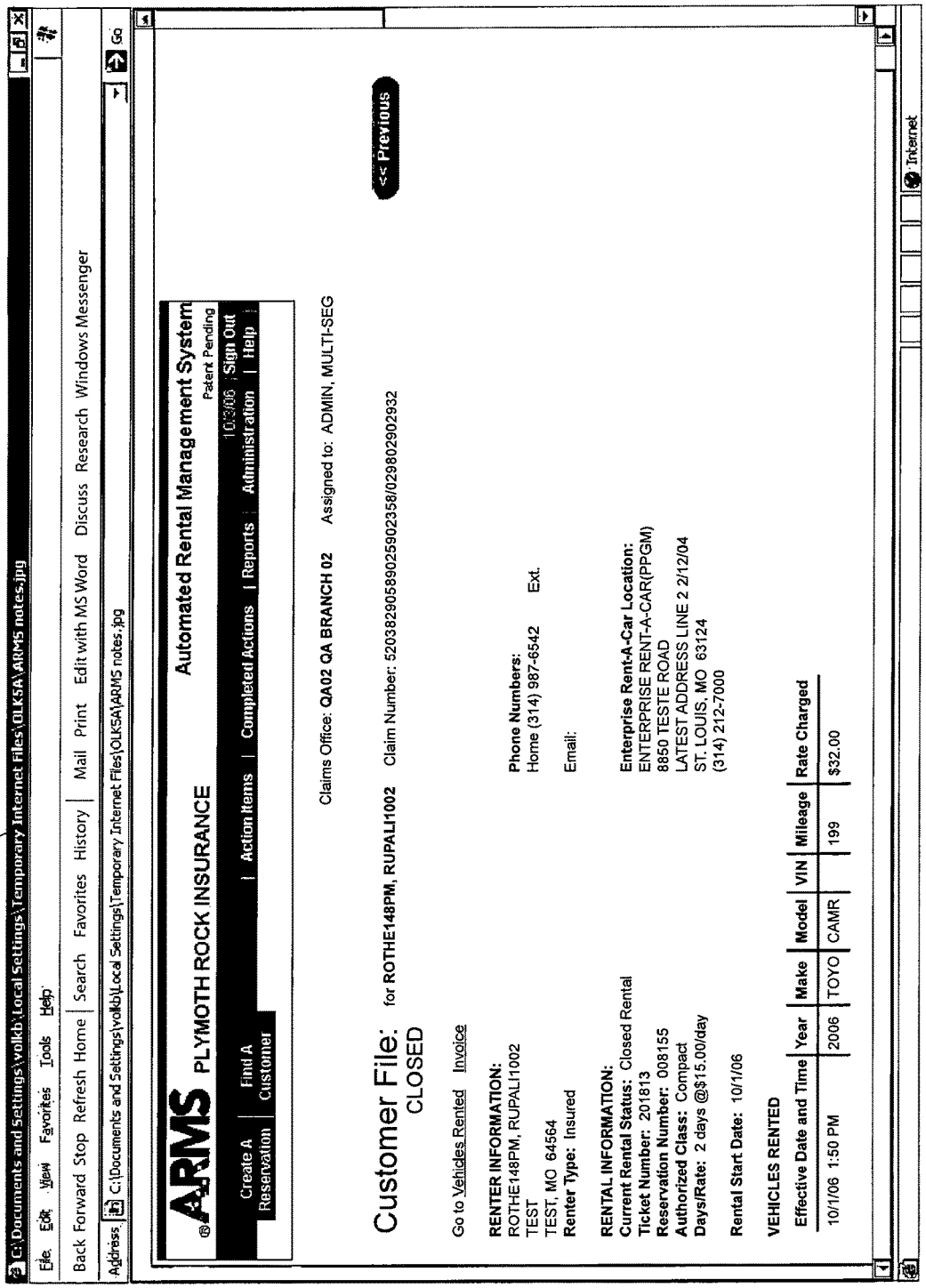
Figure 17B:
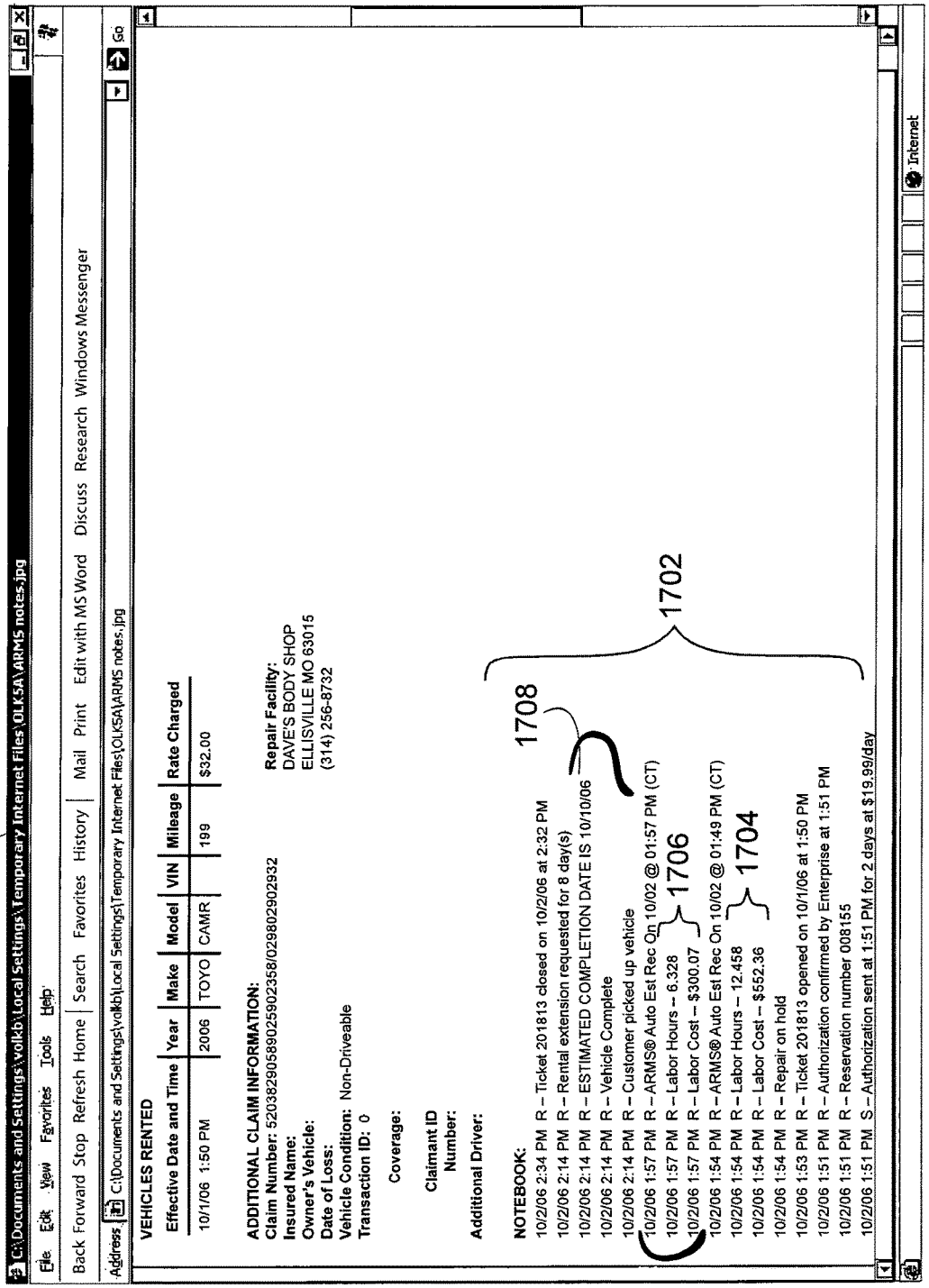

Next, at step 924 this RO/EMS data becomes available for access by users of the business partner computer system 112 (such as insurance adjusters) when those users manage rental vehicle reservations for insureds and claimants through the ARMS system 110. FIGS. 17(*a*)-(*c*) depict an exemplary GUI screen 1700 that can be accessed by an insurance adjuster through the ARMS system, wherein the vehicle repair information is displayed thereon. In addition to a variety of other types of data pertinent to the management of a replacement rental vehicle reservation, screen 1700 preferably includes a notes section 1702. The ARMS system 110 is preferably configured to populate notes section 1702 with vehicle repair information obtained from the repair facilities in accordance with the teachings of the present invention. For example, notes section 1702 can include lines 704 that correspond to information from an estimate (labor hours/labor cost). From such information, an adjuster can decide how long a rental should be authorized. As the estimate is revised and updated, notes section 1702 preferably includes the updated estimate information, as shown in lines 1706. Furthermore, as RO data becomes available, the notes section 1702 also preferably identifies relevant portions of that data as well (e.g., line 1708 which identifies a target completion date). As the target completion date is updated, the screen 1700 will also preferably display such updates in notes section 1702.

By providing this vehicle repair information automatically to the insurance adjuster (and transparently from the perspective of the insurance adjuster), the ARMS system is able to keep insurance adjusters apprised of important information related to the rental vehicle reservations that they are managing. For example, from the displayed vehicle repair information, an adjuster can make decisions as to whether a rental's authorization period should be extended or reduced. Also, the insurance adjuster will be able to spot potential problem cases via this vehicle repair information (such as cases where the estimated completion date for the vehicle repair is much longer than expected).

FIG. 10 depicts several additional web service message exchanges between the data server 108 and the ARMS system 110. For example, the Repair Delay Status Change web service can be used to send RO updates to the ARMS system, thereby providing the ARMS system with an updated vehicle status and target completion dates for various repairs. The Repair Order Close web service message exchange occurs when the data server receives notification from the repair facility that a RO has been closed. If that RO has been linked with a rental ticket by ARMS, the ARMS system preferably updates the reservation file for that rental to reflect the closed RO. If no match has been found between the RO and a rental ticket, then the data for that RO is purged from the orphans list. Lastly, a Rental Status web service message exchange is initiated when a repair facility requests rental contract information for an insured/claimant whose vehicle in undergoing repairs. Upon receipt of such a web service request, the ARMS system is preferably configured to respond with invoice information for the pertinent rental. In turn, the data server 108 can pass this information back to the repair facility. Optionally, the Rental Status web service can be a direct repair facility-to-ARMS communication.

Figure 11:
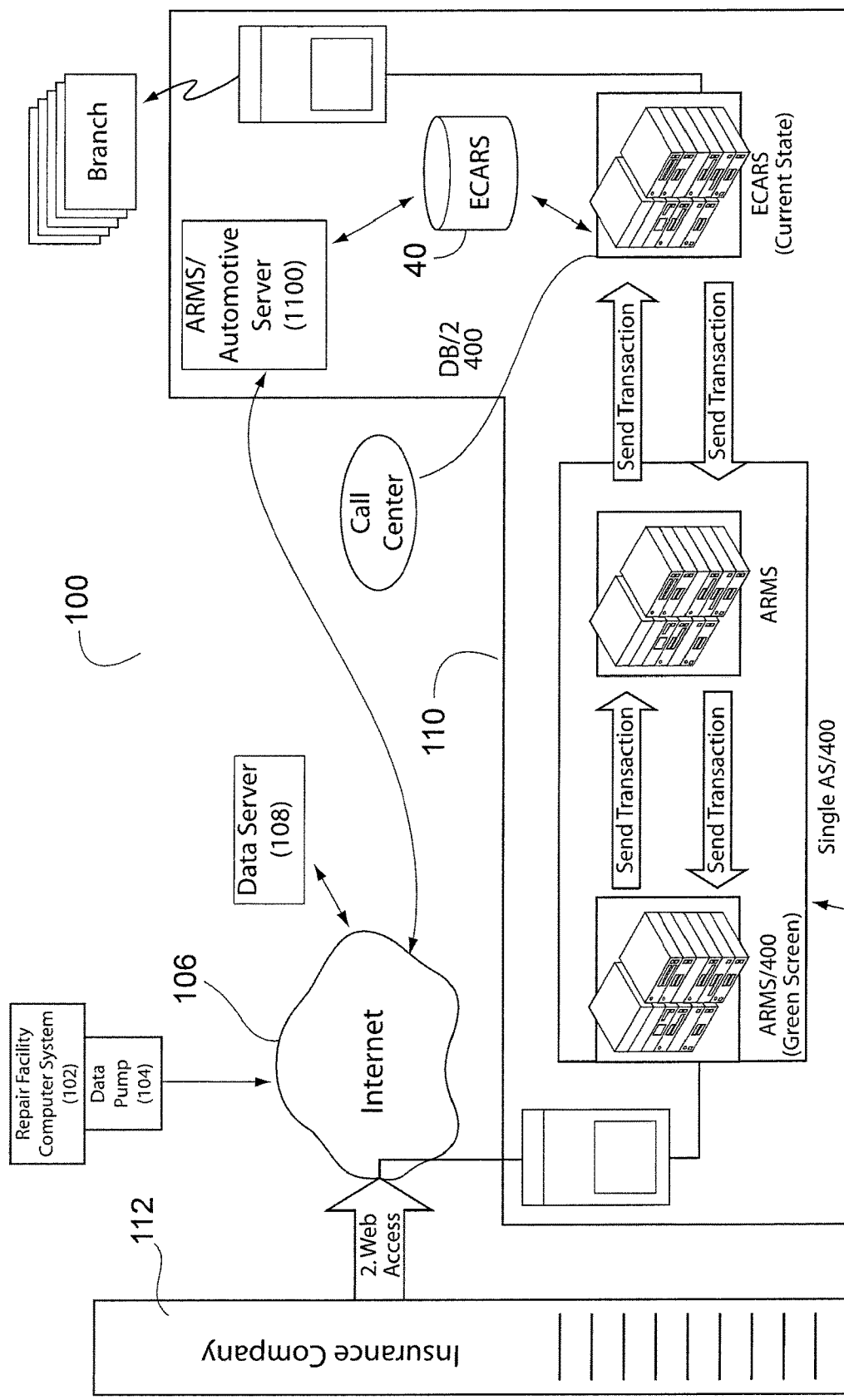
FIG. 11 depicts an example of the preferred system for use with a first embodiment of the rental vehicle reservation management system.

FIG. 11 depicts the preferred system 100, wherein the rental vehicle reservation management system 110 comprises a first embodiment of the ARMS system. The above-referenced and incorporated U.S. Pat. No. 7,275,038 describes the operation of the ARMS system of FIG. 11 in greater detail (see FIG. 1 of the '038 patent and the related description therein). In addition to the features of the ARMS system of the '038 patent, the ARMS system of FIG. 11 preferably also includes a server 1100 configured to host a website that interfaces external authorized computers (e.g., an authorized repair facility computer system 102 or an authorized data server 108) with the database 40 (or optionally a database within mainframe 32). In the environment of the FIG. 1 embodiment of the present invention, the matching process software for pairing vehicle repair information with rental tickets is preferably resident on server 1100, wherein server 1100 matches the received vehicle repair information with rental information stored in database 40 in an attempt to find matching pairs between the two.

Figure 12:
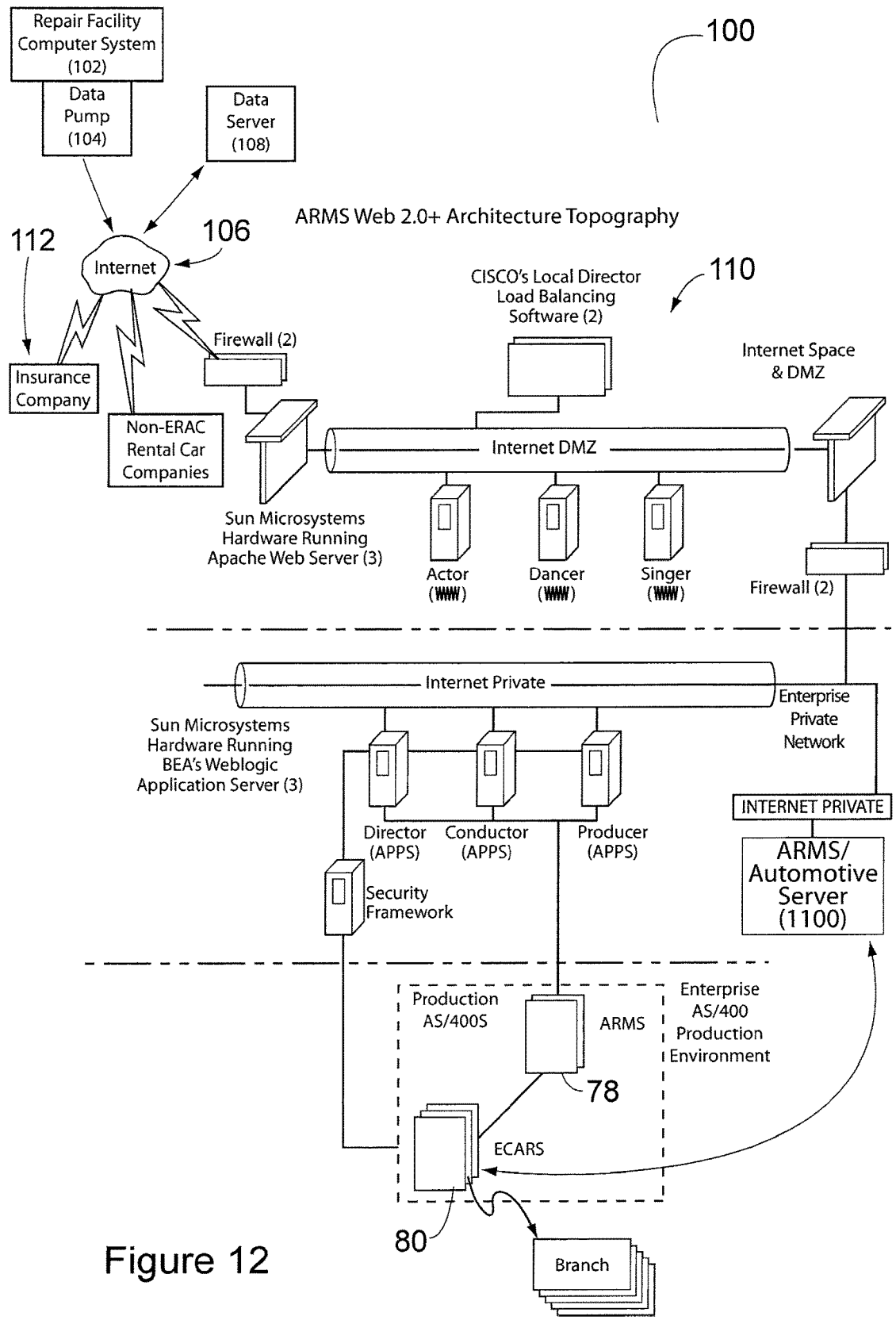
FIG. 12 depicts an example of the preferred system for use with a second embodiment of the rental vehicle reservation management system.

FIG. 12 depicts the preferred system 100, wherein the rental vehicle reservation management system 110 comprises a second embodiment of the ARMS system. The above-referenced and incorporated Ser. No. 09/694,050 patent application describes the operation of the ARMS system of FIG. 12 in greater detail (see FIG. 3 of the Ser. No. 09/694,050 application and the related description therein). In addition to the features of the ARMS system of the Ser. No. 09/694,050 patent application, the ARMS system of FIG. 12 preferably also includes a server 1100 configured to host a website that interfaces external authorized computers (e.g., an authorized repair facility computer system 102 or an authorized data server 108) with the database 80 (or optionally database 78). In the environment of the FIG. 1 embodiment of the present invention, the matching process software for pairing vehicle repair information with rental tickets is preferably resident on server 1100 as explained above.

Figure 13:
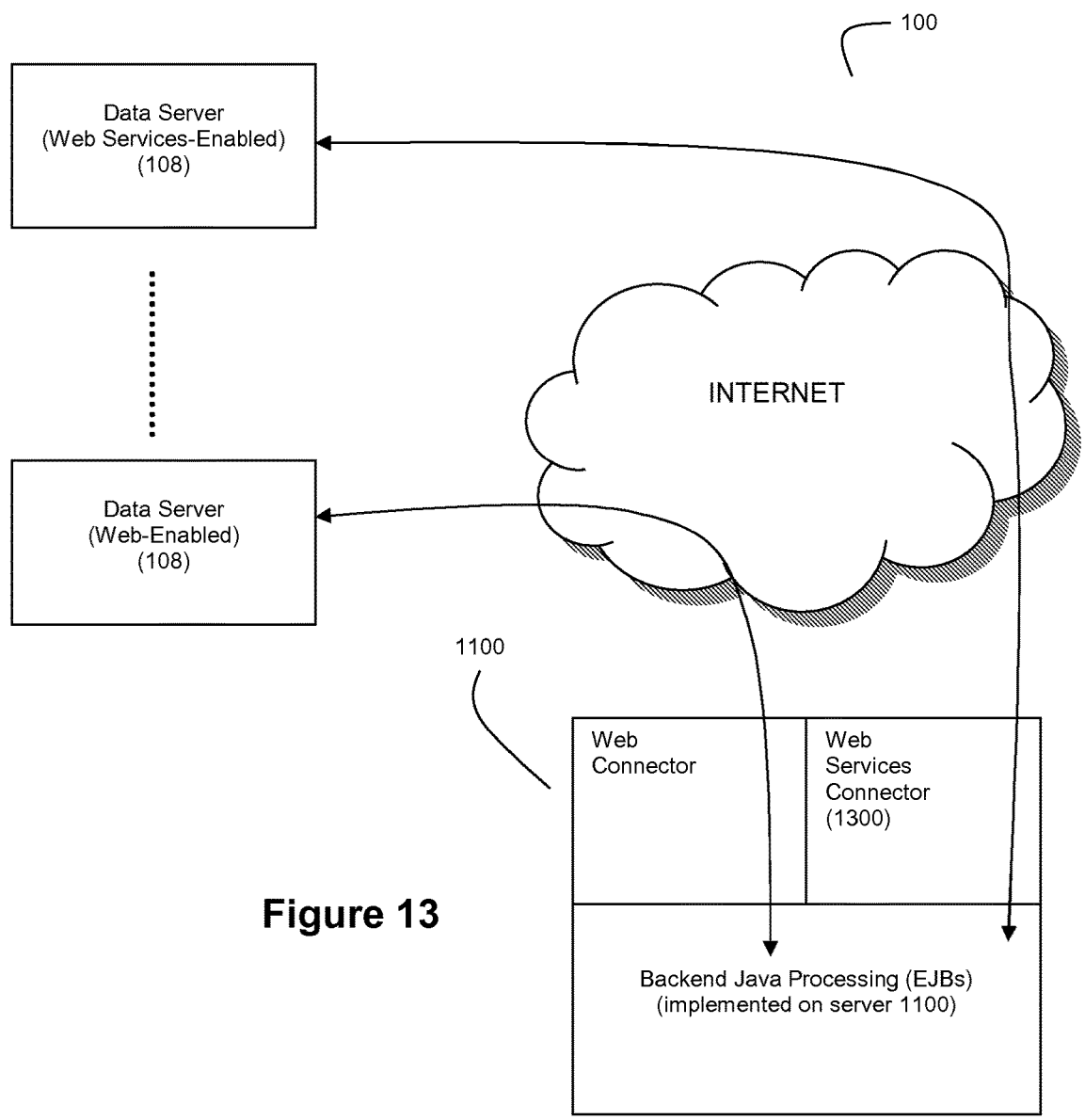
FIG. 13 depicts an example of the preferred system for use with a third embodiment of the rental vehicle reservation management system.

FIG. 13 depicts a preferred system 100 wherein the rental vehicle reservation management system 110 employs a web services connector 1300 to receive and translate the web service calls shown in FIG. 10. With reference to FIGS. 11 and 12, the web services connector 1300 can be resident on server 1100 of the ARMS system. Web services connector 1300 of FIG. 13 is preferably configured to interface communications over the network 106 from one or more business partners (e.g., data servers 108 or repair facilities 102) with the rental car company's back end processing application(s), preferably Java processing using Enterprise Java Beans (EJBs). This backend processing is preferably implemented on server 1100 as described herein. Thus, with the web services connector 1300 of FIG. 13, a business partner who is web services-enabled with respect to the rental car company can effectively communicate with server 1100. It should also be noted that the data server 108 may also be configured to communicate vehicle repair information to the ARMS system using techniques other than XML-based web services (e.g., FTP, HTTP or email communications). As such, FIG. 13 also depicts a data server 108 that communicates with the ARMS system 110 using web communications, but not web services.

Figure 14:
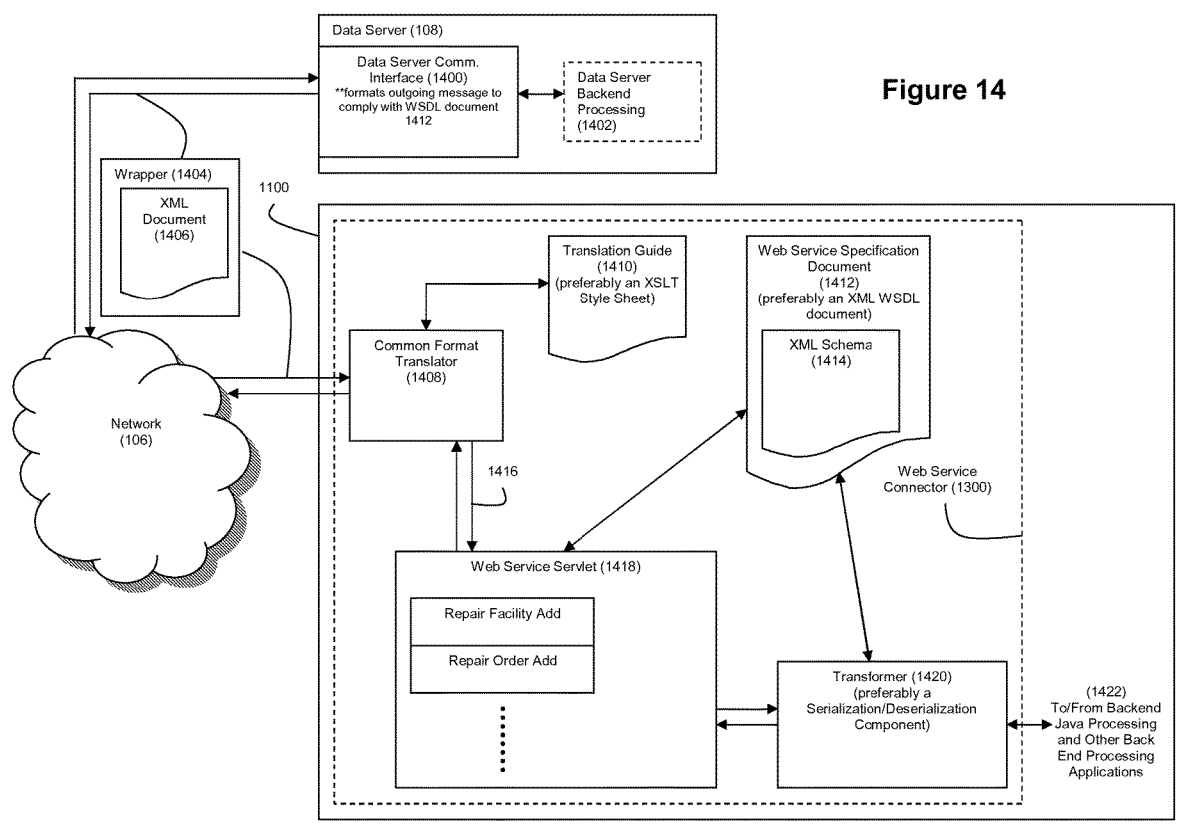
FIG. 14 is a block diagram overview of the web services communications that occur between the data server and the rental vehicle reservation management system.

FIG. 14 further details how the web service message exchanges between the data server 108 and the ARMS system 110 can be achieved. The basic manner of operation for the arrangement of FIG. 14 is described in above-referenced parent U.S. patent application Ser. No. 10/865,116. With the embodiment of FIG. 14, the arrangement would be tailored for the process flow of FIG. 10. As shown, in FIG. 14, a business partner such as data server 108 can send a document 1406 over network 106 to the rental car company's computer system 110 (preferably to server 1100 as shown in FIG. 11). The document 1406 is a message of variable length and variable format, preferably an XML document. The XML document 1406 is also preferably enclosed in a wrapper such as a Simple Object Access Protocol (SOAP) envelope 1404 and delivered over the network using the http protocol. In such an implementation, the http protocol can include a SOAP action line that specifies the type of web service operation being requested by the document 1406.

So that the data server 108 may know how to properly communicate data with the web service connector 1300, a web service specification document 1412 is preferably made known to both the operator of the data server 108 and the rental car company. The web service specification document 1412, which is preferably a Web Service Description Language (WSDL) document 1412 describes the types of web service operations available from the rental car company, describes where to find the web service, and describes the data requirements for successfully communicating with the web service. In a preferred embodiment, an XML schema 1414 comprises part of the WSDL document 1412. The XML schema 1414 describes these data requirements. A preferred WSDL document 1412 for use with the present invention can be generated using ordinary skill in the art upon a review of the teachings herein and readily-known CIECA standards.

Using the WSDL document 1412, a technician of the data server 108 can appropriately program the data server 108 to format outgoing messages destined for the rental car company such that the data requirements of the XML schema 1414 are met. The technician can also program the data server 108 such that web service requests from the data server 108 are directed to the appropriate URL of the rental car company's web service, which is also identified in the WSDL document 1412. The data server 108 can achieve this task with a web services communication interface 1400 that functions similarly to the web services connector 1300, albeit the communication interface 1400 may optionally (if necessary) format outgoing data from the data format of the business partner's back end system 1402 to the XML format of the WSDL document 1412.

If multiple data servers 108 are employed in system 100, it can then be expected that different data servers 108 will use slightly different formatting for their XML documents 1406, typically driven by each data server's own business needs. To accommodate such flexibility on the part of its business partners, the rental car company preferably uses a common format translator 1408. Upon receipt of the XML document 1406, the common format translator 1408, which is preferably a servlet within web service connector 1300, operates to translate each received XML document to a common XML format. Thus, any formatting heterogeneities between XML documents of different data servers can be eliminated by the translator 1408. To commonly format the received XML documents 1406, the translator 202 preferably accesses a translation guide such as an Extensible Stylesheet Language Transformation (XSLT) style sheet 1410. The XSLT style sheet 1410 defines how to map each data server's XML document to an XML document of the common format desired by the web service connector 1300. A separate XSLT style sheet 1410 can be maintained for each data server, if desired.

The translated XML document 1416 produced by translator 1408 is received by web service servlet 1418. Web service servlet 1418 functions to identify, using WSDL document 1412, the web service operation that corresponds to XML document 1416. Examples of preferred inbound web service operations supported by a preferred embodiment of the invention include those shown in FIG. 10. WSDL 1412 defines the data requirements for interacting with each of these web service operations.

Once the proper web service operation for the XML document has been identified, The XML data of XML document 1416 is passed to transformer software 1420 which operates to transform the XML data of the XML document 1416 to one or more data objects of the format supported by the backend processing of server 1100. To achieve this transformation, the transformer 1420 preferably accesses the WSDL document 1412 to identify how to appropriately map the XML data into Java objects 1422. In a preferred embodiment, the transformer software 1420 is a serialization/deserialization component that functions to transform the XML data of XML document 1416 into one or more Java objects 1422 that are passed to the business logic resident on the backend of server 1100. As mentioned above, additional details regarding the architecture of FIG. 14 are described in the parent Ser. No. 10/865,116 patent application.

It should also be noted that the data server 108 can be configured to perform a filtering operation on the vehicle repair data that it receives from a repair facility such that only a plurality of pre-selected data fields within the vehicle repair data are passed on to the reservation management computer system 110 (rather than all of the fields in the vehicle repair data). For example, this filter can limit the delivery of data to the reservation management computer system 110 to pre-selected data fields such as labor hours, labor costs, estimated completion date, etc. In addition to any of the data fields described such as the ones described above, the following data fields in the vehicle repair data can also be allowed to pass the filter: (1) assignment date, (2) original estimate date, (3) date-in, (4) repair start date, (5) supplement identifier, (6) date(s) of the corresponding supplements, (7) point of impact, (8) vehicle driveability status (e.g., driveable or non-driveable), and (9) year, make, model and series (YMMS) for the vehicle. Of course, it should be noted that different practitioners of the invention may be interested in the receipt of different data fields of the vehicle repair data, and they may configure a filter based on those interests.

Furthermore, a filter can be employed by the data server 108 such that less than all of the repair estimates and/or repair orders are communicated to the reservation management system. It can be expected that many of the repair estimates and repair orders retrieved by the data pump and uploaded to the data server will not pertain to replacement rental vehicles under management by the reservation management system. Thus, it is preferred that the data server 108 perform a filtering operation on the vehicle repair data it receives to limit the vehicle repair data that gets forwarded on the reservation management computer system. Such filtering can be done in any of a number of ways. For example, in estimate files, there is a field that identifies the insurance company to which the estimate is applicable. The filter can be configured to read this field and include/exclude files for transmission to the reservation management computer system based on the content of this field within each estimate. In this manner, the reservation management computer system can limits its receipt of vehicle repair data to only vehicle repair data pertaining to insurance companies who manage their customers' replacement rentals through the reservation management computer system.

Another example of a filtering operation that can be performed by the data server is a filtering operation to remove or redact "personally identifiable" information from the vehicle repair data that gets communicated to the reservation management system. Examples of "personally identifiable" information include names, telephone numbers, addresses, social security numbers, credit card numbers, etc. To the extent that such information is present in the vehicle repair data, a filter can be employed to remove or redact that information. For example, a data field for driver name that is populated by "John Smith" can be redacted by the filter to read "John S**". Similarly, the telephone number "314-555-5555" could be redacted to read "*-***-5555". Furthermore, the filter could also operate to remove this data entirely. Further still, any reports that are generated from the vehicle repair data could similarly have their personally identifiable information filtered therefrom.

While it is preferred that the data server 108 perform these filtering operations, it should also be noted that the data pump 104 could also be configured to perform such filtering if desired by a practitioner of the invention.

Further still, it should be noted that the respective components of system 100 can be configured to perform encryption and decryption operations on the data it communicates/receives such that the data flowing over paths 120, 122, and 124 is secure. Secure socket technology can also be used for this purpose.

Figure 16:
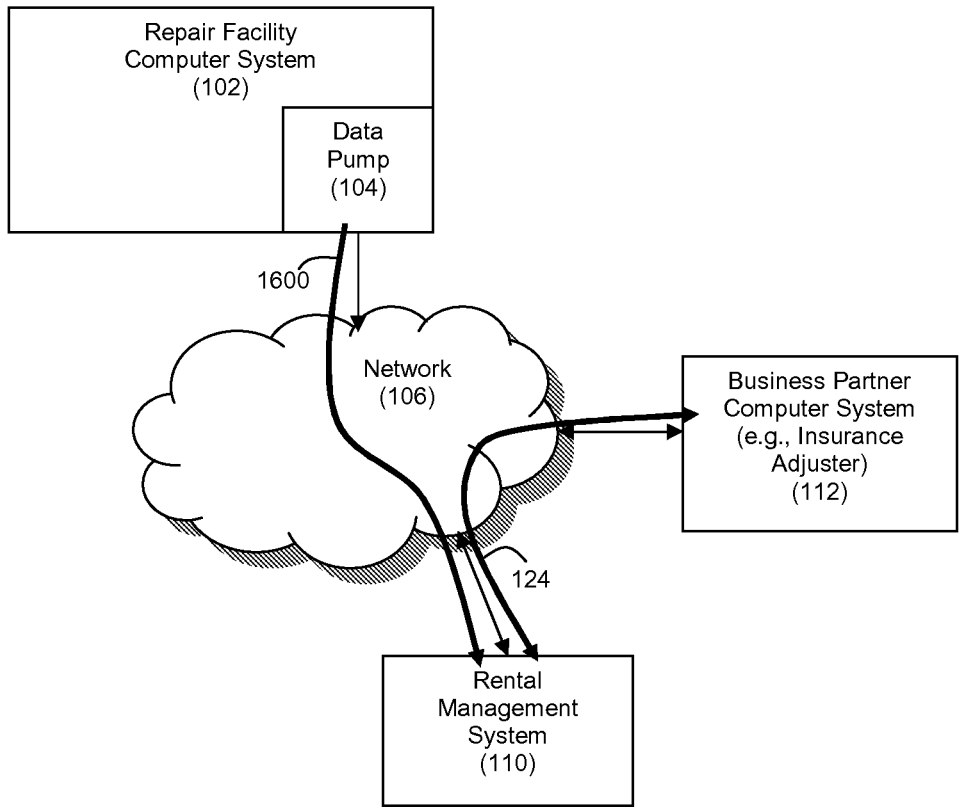
FIG. 16 depicts an exemplary system in accordance with another embodiment of the present invention.

Various changes and modifications to the preferred embodiment as explained herein would be envisioned by those of skill in the art. For example, as shown in FIG. 16, the data server 108 may optionally be eliminated from the system 100. In such cases, the data pump 104 would be modified to upload its RO/EMS files directly to the ARMS system 110 via path 1600 (preferably still using the messaging flow of FIG. 10). Further still, the system could be configured where some repair facilities send their RO/EMS data to the ARMS system 110 using the data server 108, while other repair facilities pump their RO/EMS information directly to the ARMS system 110, thereby bypassing the data server 108. Further still, while there is not currently a standardized format for RO files as there is with the EMS format for estimates, it should be noted that if such a standardized RO format is developed in the future, then the RO pump 104a could be configured largely like the estimate pump 104b described herein, albeit being configured to retrieve pertinent RO files from the BSMS file directory. These and other changes and modifications should be considered as part of the invention, and the invention should be considered as limited only by the scope of any claims drawn thereto and their legal equivalents.

What is claimed is:

1. A system for reducing data entry redundancy and increasing automation with respect to communicating vehicle repair data among a plurality of parties using specially configured data pump technology, the system comprising:

a first computer system associated with a repair facility, wherein the repair facility computer system comprises a body shop management system for managing a plurality of repair orders for vehicles undergoing repair at the repair facility, the body shop management system comprising a database in which repair order data is stored, wherein the repair order data is stored in the database as relational data having a plurality of fields;

a second computer system, wherein the second computer system comprises a data server; and a reservation management computer system for communicating with the data server over a computer network, the reservation management computer system configured to create and manage a plurality of replacement rental vehicle reservations corresponding to at least a plurality of the vehicles undergoing repair at the repair facility in response to input from a remote computer;

wherein the repair facility computer system is in communication with the second computer system over a network;

wherein the repair facility computer system is configured to execute a software application; and wherein the software application comprises a repair order data pump, the repair order data pump configured to (1) run on the repair facility computer system as a background service of the repair facility computer system to automatically connect to the body shop management system on a scheduled basis without human intervention, and (2) in response to a connection with the body shop management system, (i) automatically query the database for new and updated repair order data without human intervention to thereby identify new and updated repair order data relative to a previous retrieval operation by querying the database for (a) all repair orders that have a data field indicative of an open status, and (b) all repair orders that have a data field indicative of a closed status, wherein the closed status was achieved within a predetermined number of previous days, (ii) automatically retrieve the identified new and updated repair order data from the database in response to the query without human intervention, and (iii) automatically send the retrieved repair order data to the second computer system over the network without human intervention to thereby achieve a transmission of vehicle repair data to the second computer system without requiring a user of the repair facility computer system to enter repair order data into an application other than the body shop management system;

wherein the data server is further configured to send vehicle repair data received from the software application and pertaining to a plurality of replacement rental vehicle reservations managed by the reservation management computer system to the reservation management computer system via the computer network; and wherein the reservation management computer system is further configured to (1) receive the vehicle repair data sent to it from the data server, and (2) perform a plurality of management operations on replacement rental vehicle reservations using the vehicle repair data received from the data server, the management operations including a plurality of extensions of a plurality of the replacement rental vehicle reservations based on the new and updated vehicle repair order data retrieved from the database by the repair order data pump.

2. The system of claim 1 wherein the data server is further configured to perform a filtering operation on the received vehicle repair data to limit the received vehicle repair data that gets sent to the reservation management computer system.

3. The system of claim 1 wherein the reservation management computer system is further configured to perform a matching operation on the vehicle repair data it receives from the data server to pair the vehicle repair data with any existing replacement rental vehicle reservations.

4. The system of claim 1 wherein the repair order data pump is further configured to perform a filtering operation on the retrieved data to limit the retrieved data that gets sent to the data server.

5. The system of claim 1 wherein the repair order data pump is further configured to automatically send only a plurality of predetermined data fields of the identified new and updated repair order data to the second computer system over the network without human intervention.

6. The system of claim 1 wherein the repair facility computer system further comprises an estimating system for managing a plurality of vehicle repair estimates for vehicles undergoing repair at the repair facility, the estimating system configured to store a plurality of estimate management standard (EMS) files corresponding to a plurality of vehicle repair estimates for vehicles undergoing repair at the repair facility in a file directory of the repair facility computer system, the EMS files storing labor hours estimation data that comprises an estimate as to how many labor hours are needed to complete repairs to at least one vehicle undergoing repair at the repair facility, wherein the software application further comprises an EMS data pump, the EMS data pump comprising a configuration file, the EMS data pump configured to (1) run on the repair facility computer system, without human intervention, in at least one of an event mode and a polling mode, and (2) in response to running, (i) automatically identify the file directory where the EMS files are stored without human intervention based on data in the configuration file, (ii) automatically search the identified file directory for new and updated EMS file data, (iii) automatically retrieve the new and updated EMS file data without human intervention in response to the search, and (iv) automatically send the retrieved EMS file data to the second computer system over the network without human intervention to thereby achieve a transmission of vehicle repair data to the second computer system without requiring a user of the repair facility computer system to enter estimate data into an application other than the estimating system.

7. The system of claim 1 wherein the reservation management computer system is further configured to interact with the data server and at least one of a plurality of remote computers using web services communications.

8. The system of claim 7 wherein the reservation management computer system and the data server are configured to interact with each other via a plurality of web services transactions, the web services transactions comprising a repair order add web services transaction, a rental add web services transaction, a repair delay status change web services transaction, a repair order close web services transaction, and a rental status web services transaction.

9. The system of claim 1 wherein the repair facility computer system and the rental management computer system are further configured to execute a web service transaction with respect to each other;

wherein the rental management computer system is further configured to assign a unique identifier to the repair facility in response to the executed web service transaction; and wherein the repair order data pump is further configured to use the unique identifier in messages sent to the second computer system when automatically sending the retrieved repair order data to the second computer system over the network.

10. The system of claim 1 wherein the first computer system, the second computer system, and the reservation management computer system define a distributed computing architecture that enhances how vehicle repair data is processed to support management operations on replacement rental vehicle reservations.

11. A system for reducing data entry redundancy and increasing automation with respect to communicating vehicle repair data among a plurality of parties using specially configured data pump technology, the system comprising:

a first computer system associated with a repair facility, wherein the repair facility computer system comprises a body shop management system for managing a plurality of repair orders for vehicles undergoing repair at the repair facility, the body shop management system comprising a database in which repair order data is stored, wherein the repair order data is stored in the database as relational data having a plurality of fields; and a second computer system, wherein the second computer system comprises a reservation management computer system, the reservation management computer system configured to create and manage a plurality of replacement rental vehicle reservations corresponding to at least a plurality of the vehicles undergoing repair at the repair facility in response to input from a remote computer;

wherein the repair facility computer system is in communication with the second computer system over a network;

wherein the repair facility computer system is configured to execute a software application; and wherein the software application comprises a repair order data pump, the repair order data pump configured to (1) run on the repair facility computer system as a background service of the repair facility computer system to automatically connect to the body shop management system on a scheduled basis without human intervention, and (2) in response to a connection with the body shop management system, (i) automatically query the database for new and updated repair order data without human intervention to thereby identify new and updated repair order data relative to a previous retrieval operation by querying the database for (a) all repair orders that have a data field indicative of an open status, and (b) all repair orders that have a data field indicative of a closed status, wherein the closed status was achieved within a predetermined number of previous days, (ii) automatically retrieve the identified new and updated repair order data from the database in response to the query without human intervention, and (iii) automatically send the retrieved repair order data to the second computer system over the network without human intervention to thereby achieve a transmission of vehicle repair data to the second computer system without requiring a user of the repair facility computer system to enter repair order data into an application other than the body shop management system; and wherein the reservation management computer system is further configured to (1) receive the vehicle repair data sent to it from the software application, and (2) perform a plurality of management operations on replacement rental vehicle reservations using the vehicle repair data received from the software application, the management operations including a plurality of extensions of a plurality of the replacement rental vehicle reservations based on the new and updated vehicle repair order data retrieved from the database by the repair order data pump.

12. The system of claim 11 wherein the repair order data pump is further configured to perform a filtering operation on the retrieved data to limit the retrieved data that gets sent to the reservation management computer system.

13. The system of claim 11 wherein the reservation management computer system is further configured to perform a matching operation on the vehicle repair data it receives from the repair facility computer system to pair the vehicle repair data with any existing replacement rental vehicle reservations.

14. The system of claim 11 wherein the repair facility computer system and the rental management computer system are further configured to execute a web service transaction with respect to each other;

wherein the rental management computer system is further configured to assign a unique identifier to the repair facility in response to the executed web service transaction; and wherein the repair order data pump is further configured to use the unique identifier in messages sent to the second computer system when automatically sending the retrieved repair order data to the second computer system over the network.

15. The system of claim 11 wherein the first computer system and the second computer system define a distributed computing architecture for processing vehicle repair data in a distributed manner that enhances how vehicle repair data is processed to support management operations on replacement rental vehicle reservations.

16. A system for reducing data entry redundancy and increasing automation with respect to communicating vehicle repair data among a plurality of parties using specially configured data pump technology, the system comprising:

a first computer system associated with a repair facility, wherein the repair facility computer system further comprises an estimating system for managing a plurality of vehicle repair estimates for vehicles undergoing repair at the repair facility, the estimating system configured to store a plurality of estimate management standard (EMS) files corresponding to a plurality of vehicle repair estimates for vehicles undergoing repair at the repair facility in a file directory of the repair facility computer system, the EMS files storing labor hours estimation data that comprises an estimate as to how many labor hours are needed to complete repairs to at least one vehicle undergoing repair at the repair facility, wherein each EMS file stored in the file directory that is a valid EMS file comprises a plurality of constituent standardized files; and wherein the repair facility computer system is in communication with a second computer system over a network;

wherein the repair facility computer system is configured to execute a software application; and wherein the software application further comprises an EMS data pump, the EMS data pump comprising a configuration file, the EMS data pump configured to (1) run on the repair facility computer system, without human intervention, in at least one of an event mode and a polling mode, and (2) in response to running, (i) automatically identify the file directory where the EMS files are stored without human intervention based on data in the configuration file, (ii) automatically search the identified file directory for new and updated EMS file data relative to a previous retrieval operation, (iii) automatically retrieve the new and updated EMS file data without human intervention in response to the search, and (iv) automatically send the retrieved EMS file data to the second computer system over the network without human intervention to thereby achieve a transmission of vehicle repair data to the second computer system without requiring a user of the repair facility computer system to enter estimate data into an application other than the estimating system; and wherein the EMS data pump further comprises a validation table and a component, the component being configured to validate whether each retrieved EMS file includes all of its constituent standardized files based on a reference to the validation table.

17. The system of claim 16 wherein the configuration file comprises a configurable parameter for identifying a platform of the estimating system used by the repair facility computer system, the configurable parameter identifying where in the file directory that the EMS data pump is to perform the search.

18. The system of claim 16 wherein the EMS data pump is configured to run in the event mode, and wherein the EMS data pump comprises a notification application programming interface (API) for detecting when a change occurs in the file directory to thereby trigger the EMS data pump to run.

19. The system of claim 16 wherein the EMS data pump comprises a component configured to (1) maintain a first list of previously retrieved EMS files, the first list including an identification corresponding to when the previously retrieved EMS files were last retrieved, (2) generate a second list of EMS files currently in the file directory, and (3) compare the first list with the second list to identify the new and updated EMS files for retrieval.

20. The system of claim 16 wherein the EMS data pump further comprises a component that is configured to automatically send the retrieved EMS file data to the second computer system as a web service communication.

21. The system of claim 16 further comprising the second computer system and a reservation management computer system, wherein the second computer system comprises a data server, the reservation management computer system for communicating with the data server over a computer network, the reservation management computer system configured to create and manage a plurality of replacement rental vehicle reservations corresponding to at least a plurality of the vehicles undergoing repair at the repair facility in response to input from a remote computer;

wherein the data server is further configured to send vehicle repair data received from the software application and pertaining to a replacement rental vehicle reservation managed by the reservation management computer system to the reservation management computer system via the computer network; and wherein the reservation management computer system is further configured to (1) receive the vehicle repair data sent to it from the data server, and (2) perform a plurality of management operations on replacement rental vehicle reservations using the vehicle repair data received from the data server, the management operations including an extension of a replacement rental vehicle reservation based on the vehicle repair data from a validated EMS file retrieved from the file directory by the EMS data pump.

22. The system of claim 21 wherein the reservation management computer system is further configured to interact with the data server and at least one of a plurality of remote computers using web services communications.

23. The system of claim 22 wherein the reservation management computer system and the data server are configured to interact with each other via a plurality of web services transactions, the web services transactions comprising a repair order add web services transaction, a rental add web services transaction, a repair delay status change web services transaction, a repair order close web services transaction, and a rental status web services transaction.

24. The system of claim 21 wherein the data server is further configured to perform a filtering operation on the received vehicle repair data to limit the received vehicle repair data that gets sent to the reservation management computer system.

25. The system of claim 21 wherein the reservation management computer system is further configured to perform a matching operation on the vehicle repair data it receives from the data server to pair the vehicle repair data with any existing replacement rental vehicle reservations.

26. The system of claim 21 wherein the EMS data pump is further configured to perform a filtering operation on the retrieved data to limit the retrieved data that gets sent to the data server.

27. The system of claim 21 wherein the repair facility computer system and the rental management computer system are further configured to execute a web service transaction with respect to each other;
   wherein the rental management computer system is further configured to assign a unique identifier to the repair facility in response to the executed web service transaction; and
   wherein the EMS data pump is further configured to use the unique identifier in messages sent to the second computer system when automatically sending the retrieved EMS file data to the second computer system over the network.

28. The method of claim 21 wherein the first computer system, the second computer system, and the reservation management computer system define a distributed computing architecture that enhances how vehicle repair data is processed to support management operations on replacement rental vehicle reservations.

29. The system of claim 16 further comprising the second computer system, wherein the second computer system comprises a reservation management computer system, the reservation management computer system configured to create and manage a plurality of replacement rental vehicle reservations corresponding to at least a plurality of the vehicles undergoing repair at the repair facility in response to input from a remote computer;
   wherein the reservation management computer system is further configured to (1) receive the vehicle repair data sent to it from the software application, and (2) perform a plurality of management operations on replacement rental vehicle reservations using the vehicle repair data received from the software application, the management operations including an extension of a replacement rental vehicle reservation based on the vehicle repair data from a validated EMS file retrieved from the file directory by the EMS data pump.

30. The system of claim 29 wherein the EMS data pump is further configured to perform a filtering operation on the retrieved data to limit the retrieved data that gets sent to the reservation management computer system.

31. The system of claim 29 wherein the reservation management computer system is further configured to perform a matching operation on the vehicle repair data it receives from the repair facility computer system to pair the vehicle repair data with any existing replacement rental vehicle reservations.

32. The system of claim 29 wherein the repair facility computer system and the rental management computer system are further configured to execute a web service transaction with respect to each other;
   wherein the rental management computer system is further configured to assign a unique identifier to the repair facility in response to the executed web service transaction; and
   wherein the EMS data pump is further configured to use the unique identifier in messages sent to the second computer system when automatically sending the retrieved EMS file data to the second computer system over the network.

33. The system of claim 29 wherein the first computer system and the second computer system define a distributed computing architecture for processing vehicle repair data in a distributed manner that enhances how vehicle repair data is processed to support management operations on replacement rental vehicle reservations.

34. A computer-implemented method for reducing data entry redundancy and increasing automation with respect to communicating vehicle repair data among a plurality of parties using specially configured data pump technology, the method comprising:
   executing a software application on a repair facility computer system, wherein the repair facility computer system comprises a body shop management system for managing a plurality of repair orders for vehicles undergoing repair at the repair facility, the body shop management system comprising a database in which repair order data is stored, wherein the repair order data is stored in the database as relational data having a plurality of fields, the vehicle repair data comprising labor hours estimation data that comprises an estimate as to how many labor hours are needed to complete repairs to at least one vehicle undergoing repair at the repair facility, and wherein the software application comprises a repair order data pump; and
   wherein the software application executing step comprises the repair order data pump (1) running on the repair facility computer system as a background service of the repair facility computer system to automatically connect to the body shop management system on a scheduled basis without human intervention, and (2) in response to connecting with the body shop management system, (i) automatically querying the database for new and updated repair order data without human intervention to thereby identify new and updated repair order data relative to a previous retrieval operation by querying the database for (a) all repair orders that have a data field indicative of an open status, and (b) all repair orders that have a data field indicative of a closed status, wherein the closed status was achieved within a predetermined number of previous days, (ii) automatically retrieving the identified new and updated repair order data from the database in response to the query without human intervention, the retrieved repair order data including labor hours estimation data for at least one vehicle undergoing repair at the repair facility, and (iii) automatically sending the retrieved repair order data to a second computer system over a network without human intervention to thereby achieve a transmission of vehicle repair data to the second computer system without requiring a user of the repair facility computer system to enter repair order data into an application other than the body shop management system, wherein the second computer system comprises a reservation management computer system, the reservation management computer system configured to create and manage a plurality of replacement rental vehicle reservations corresponding to at least a plurality of the vehicles undergoing repair at the repair facility in response to input from a remote computer, the method further comprising:

the reservation management computer system (1) receiving the vehicle repair data sent to it from the software application, and (2) performing a plurality of management operations on replacement rental vehicle reservations using the vehicle repair data received from the software application, the management operations including a plurality of extensions of a plurality of the replacement rental vehicle reservations based on the new and updated vehicle repair order data retrieved from the database by the repair order data pump.

35. The method of claim 34 further comprising:
accessing a server on which the software application is stored;
downloading the software application to the repair facility computer system; and
installing the downloaded software application on the repair facility computer system; and
wherein the executing step comprises the repair facility computer system automatically executing the installed software application without human intervention.

36. The method of claim 35 further comprising:
accessing, with the repair facility computer system, a page of a website maintained by a rental car company, the website being configured to pass the repair facility computer system to the server.

37. The method of claim 36 wherein the server is operated by a third party.

38. The method of claim 34 wherein the software application executing step further comprises the repair order data pump automatically sending only a plurality of predetermined data fields of the identified new and updated repair order data to the second computer system over the network without human intervention.

39. The method of claim 34 wherein the repair facility computer system further comprises an estimating system for managing a plurality of vehicle repair estimates for vehicles undergoing repair at the repair facility, the estimating system configured to store a plurality of estimate management standard (EMS) files corresponding to a plurality of vehicle repair estimates for vehicles undergoing repair at the repair facility in a file directory of the repair facility computer system, the EMS files storing the labor hours estimation data, wherein the software application further comprises an EMS data pump, the EMS data pump comprising a configuration file, and wherein the software application executing step further comprises the EMS data pump (1) running on the repair facility computer system, without human intervention, in at least one of an event mode and a polling mode, and (2) in response to running, (i) automatically identifying the file directory where the EMS files are stored without human intervention based on data in the configuration file, (ii) automatically searching the identified file directory for new and updated EMS file data, (iii) automatically retrieving the new and updated EMS file data without human intervention in response to the search, and (iv) automatically sending the retrieved EMS file data to the second computer system over the network without human intervention to thereby achieve a transmission of vehicle repair data to the second computer system without requiring a user of the repair facility computer system to enter estimate data into an application other than the estimating system.

40. The method of claim 34 further comprising performing a filtering operation on the vehicle repair data such that only a plurality of pre-selected data fields of the vehicle repair data are received by the reservation management computer system.

41. The method of claim 40 wherein the filtering operation is performed by the repair order data pump.

42. The method of claim 34 further comprising the reservation management computer system performing a matching operation on the vehicle repair data it receives from the repair facility computer system to pair the vehicle repair data with any existing replacement rental vehicle reservations.

43. The method of claim 34 further comprising:
executing a web service transaction with respect to the repair facility computer system and the second computer system;
the second computer system assigning a unique identifier to the repair facility in response to the executed web service transaction; and
the repair order data pump using the unique identifier in messages sent to the second computer system when automatically sending the retrieved repair order data to the second computer system over the network.

44. The method of claim 34 wherein the first computer system and the second computer system define a distributed computing architecture that enhances how vehicle repair data is processed to support management operations on replacement rental vehicle reservations.

45. A computer-implemented method for reducing data entry redundancy and increasing automation with respect to communicating vehicle repair data among a plurality of parties using specially configured data pump technology, the method comprising:
executing a software application on a repair facility computer system, wherein the repair facility computer system comprises a body shop management system for managing a plurality of repair orders for vehicles undergoing repair at the repair facility, the body shop management system comprising a database in which repair order data is stored, wherein the repair order data is stored in the database as relational data having a plurality of fields, the vehicle repair data comprising labor hours estimation data that comprises an estimate as to how many labor hours are needed to complete repairs to at least one vehicle undergoing repair at the repair facility, and wherein the software application comprises a repair order data pump; and
wherein the software application executing step comprises the repair order data pump (1) running on the repair facility computer system as a background service of the repair facility computer system to automatically connect to the body shop management system on a scheduled basis without human intervention, and (2) in response to connecting with the body shop management system, (i) automatically querying the database for new and updated repair order data without human intervention to thereby identify new and updated repair order data relative to a previous retrieval operation by querying the database for (a) all repair orders that have a data field indicative of an open status, and (b) all repair orders that have a data field indicative of a closed status, wherein the closed status was achieved within a predetermined number of previous days, (ii) automatically retrieving the identified new and updated repair order data from the database in response to the query without human intervention, the retrieved repair order data including labor hours estimation data for at least one vehicle undergoing repair at the repair facility, and (iii) automatically sending the retrieved repair order data to a second computer system over a network without human intervention to thereby achieve a transmission of vehicle repair data to the second computer system without requiring a user of the repair facility computer system to enter repair order data into an application other than the body shop management system, wherein the second computer system comprises a data server, the data server in communication with a reservation management computer system via a computer network, the reservation management computer system configured to create and manage a plurality of replacement rental vehicle reservations corresponding to at least a plurality of the vehicles undergoing repair at the repair facility in response to input from a remote computer, the method further comprising:

the data server sending vehicle repair data received from the software application and pertaining to a plurality of replacement rental vehicle reservations managed by the reservation management computer system to the reservation management computer system via the computer network; and the reservation management computer system (1) receiving the vehicle repair data sent to it from the data server, and (2) performing a plurality of management operations on replacement rental vehicle reservations using the vehicle repair data received from the data server, the management operations including a plurality of extensions of a plurality of the replacement rental vehicle reservations based on the new and updated vehicle repair order data retrieved from the database by the repair order data pump.

46. The method of claim 45 further comprising performing a filtering operation on the vehicle repair data such that only a plurality of pre-selected data fields of the vehicle repair data are received by the reservation management computer system.

47. The method of claim 46 wherein the filtering operation is performed by the data server.

48. The method of claim 46 wherein the filtering operation is performed by the repair order data pump.

49. The method of claim 45 further comprising the reservation management computer system performing a matching operation on the vehicle repair data it receives from the data server to pair the vehicle repair data with any existing replacement rental vehicle reservations.

50. The method of claim 45 further comprising the reservation management computer system interacting with the data server and at least one of a plurality of remote computers using web services communications.

51. The method of claim 50 wherein the interacting step comprises the reservation management computer system and the data server are interacting with each other via a plurality of web services transactions, the web services transactions comprising a repair order add web services transaction, a rental add web services transaction, a repair delay status change web services transaction, a repair order close web services transaction, and a rental status web services transaction.

52. The method of claim 45 further comprising:
executing a web service transaction with respect to the repair facility computer system and the second computer system;
the second computer system assigning a unique identifier to the repair facility in response to the executed web service transaction; and
the repair order data pump using the unique identifier in messages sent to the second computer system when automatically sending the retrieved repair order data to the second computer system over the network.

53. The method of claim 45 wherein the first computer system, the second computer system, and the reservation management computer system define a distributed computing architecture that enhances how vehicle repair data is processed to support management operations on replacement rental vehicle reservations.

54. A computer-implemented method for reducing data entry redundancy and increasing automation with respect to communicating vehicle repair data among a plurality of parties using specially configured data pump technology, the method comprising:
executing a software application on a repair facility computer system, wherein the repair facility computer system further comprises an estimating system for managing a plurality of vehicle repair estimates for vehicles undergoing repair at the repair facility, the estimating system configured to store a plurality of estimate management standard (EMS) files corresponding to a plurality of vehicle repair estimates for vehicles undergoing repair at the repair facility in a file directory of the repair facility computer system, the EMS files storing labor hours estimation data that comprises an estimate as to how many labor hours are needed to complete repairs to at least one vehicle undergoing repair at the repair facility, wherein each EMS file stored in the file directory that is a valid EMS file comprises a plurality of constituent standardized files, and wherein the software application further comprises an EMS data pump, the EMS data pump comprising a configuration file; and
wherein the software application executing step further comprises the EMS data pump (1) running on the repair facility computer system, without human intervention, in at least one of an event mode and a polling mode, and (2) in response to running, (i) automatically identifying the file directory where the EMS files are stored without human intervention based on data in the configuration file, (ii) automatically searching the identified file directory for new and updated EMS file data relative to a previous retrieval operation, (iii) automatically retrieving the new and updated EMS file data without human intervention in response to the search, the retrieved EMS file data including labor hours estimation data for at least one vehicle undergoing repair at the repair facility, and (iv) automatically sending the retrieved EMS file data to a second computer system over a network without human intervention to thereby achieve a transmission of vehicle repair data to the second computer system without requiring a user of the repair facility computer system to enter estimate data into an application other than the estimating system; and wherein the EMS data pump further comprises a validation table, and wherein the software application executing step comprises a component of the EMS data pump validating whether each retrieved EMS file includes all of its constituent standardized files based on a reference to the validation table.

55. The method of claim 54 further comprising:
defining a configurable parameter in the configuration file for the EMS data pump to thereby identify a platform of the estimating system used by the repair facility computer system, the configurable parameter identifying where in the file directory that the search is to be performed.

56. The method of claim 54 wherein running step comprises the EMS data pump running in the event mode, and wherein the EMS data pump comprises a notification application programming interface (API), the notification API detecting when a change occurs in the file directory to thereby trigger the EMS data pump to run.

57. The method of claim 54 wherein the software application executing step comprises a component of the EMS data pump (1) maintaining a first list of previously retrieved EMS files, the first list including an identification corresponding to when the previously retrieved EMS files were last retrieved, (2) generating a second list of EMS files currently in the file directory, and (3) comparing the first list with the second list to identify the new and updated EMS files for retrieval.

58. The method of claim 54 wherein the software application executing step comprises a component of the EMS data pump automatically sending the retrieved EMS file data to the second computer system as a web service communication.

59. The method of claim 54 wherein the second computer system comprises a data server in communication with a reservation management computer system via a computer network, the reservation management computer system configured to create and manage a plurality of replacement rental vehicle reservations corresponding to at least a plurality of the vehicles undergoing repair at the repair facility in response to input from a remote computer, the method further comprising:
the data server sending vehicle repair data received from the software application and pertaining to a replacement rental vehicle reservation managed by the reservation management computer system to the reservation management computer system via the computer network; and
the reservation management computer system (1) receiving the vehicle repair data sent to it from the data server, and (2) performing a plurality of management operations on replacement rental vehicle reservations using the vehicle repair data received from the data server, the management operations including an extension of a replacement rental vehicle reservation based on the vehicle repair data from a validated EMS file retrieved from the file directory by the EMS data pump.

60. The method of claim 59 further comprising the reservation management computer system interacting with the data server and at least one of a plurality of remote computers using web services communications.

61. The method of claim 60 wherein the interacting step comprises the reservation management computer system and the data server are interacting with each other via a plurality of web services transactions, the web services transactions comprising a repair order add web services transaction, a rental add web services transaction, a repair delay status change web services transaction, a repair order close web services transaction, and a rental status web services transaction.

62. The method of claim 59 further comprising performing a filtering operation on the vehicle repair data such that only a plurality of pre-selected data fields of the vehicle repair data are received by the reservation management computer system.

63. The method of claim 62 wherein the filtering operation is performed by the data server.

64. The method of claim 62 wherein the filtering operation is performed by the EMS data pump.

65. The method of claim 59 further comprising the reservation management computer system performing a matching operation on the vehicle repair data it receives from the data server to pair the vehicle repair data with any existing replacement rental vehicle reservations.

66. The method of claim 54 wherein the second computer system comprises a reservation management computer system, the reservation management computer system configured to create and manage a plurality of replacement rental vehicle reservations corresponding to at least a plurality of the vehicles undergoing repair at the repair facility in response to input from a remote computer, the method further comprising:
the reservation management computer system (1) receiving the vehicle repair data sent to it from the software application, and (2) performing a plurality of management operations on replacement rental vehicle reservations using the vehicle repair data received from the software application, the management operations including an extension of a replacement rental vehicle reservation based on the vehicle repair data from a validated EMS file retrieved from the file directory by the EMS data pump.

67. The method of claim 66 further comprising performing a filtering operation on the vehicle repair data such that only a plurality of pre-selected data fields of the vehicle repair data are received by the reservation management computer system.

68. The method of claim 67 wherein the filtering operation is performed by the EMS data pump.

69. The method of claim 66 further comprising the reservation management computer system performing a matching operation on the vehicle repair data it receives from the repair facility computer system to pair the vehicle repair data with any existing replacement rental vehicle reservations.

70. The method of claim 54 further comprising:
accessing a server on which the software application is stored;
downloading the software application to the repair facility computer system; and
installing the downloaded software application on the repair facility computer system; and wherein the executing step comprises the repair facility computer system automatically executing the installed software application without human intervention.

71. The method of claim 70 further comprising:
accessing, with the repair facility computer system, a page of a website maintained by a rental car company, the website being configured to pass the repair facility computer system to the server.

72. The method of claim 71 wherein the server is operated by a third party.

73. The method of claim 54 further comprising:
executing a web service transaction with respect to the repair facility computer system and the second computer system;
the second computer system assigning a unique identifier to the repair facility in response to the executed web service transaction; and
the EMS data pump using the unique identifier in messages sent to the second computer system when automatically sending the retrieved EMS file data to the second computer system over the network.

74. The method of claim 54 wherein the first computer system and the second computer system define a distributed computing architecture that enhances how vehicle repair data is processed to support management operations on replacement rental vehicle reservations.

75. A computer program product for reducing data entry redundancy and increasing automation with respect to communicating vehicle repair data among a plurality of parties using specially configured data pump technology, the computer program product comprising:
a plurality of instructions that are resident on a non-transitory computer-readable storage medium, wherein the instructions are executable by a processor to automatically locate vehicle repair data that is stored within a computer system of a repair facility without human intervention, wherein the repair facility computer system further comprises an estimating system for managing a plurality of vehicle repair estimates for vehicles undergoing repair at the repair facility, the estimating system configured to store a plurality of estimate management standard (EMS) files corresponding to a plurality of vehicle repair estimates for vehicles undergoing repair at the repair facility in a file directory of the repair facility computer system, the EMS files storing labor hours estimation data that comprises an estimate as to how many labor hours are needed to complete repairs to at least one vehicle undergoing repair at the repair facility, wherein each EMS file stored in the file directory that is a valid EMS file comprises a plurality of constituent standardized files, and wherein at least a portion of the plurality of instructions comprise an EMS data pump, the EMS data pump comprising a configuration file, the EMS data pump configured to (1) run on the repair facility computer system, without human intervention, in at least one of an event mode and a polling mode, and (2) in response to running, (i) automatically identify the file directory where the EMS files are stored without human intervention based on data in the configuration file, (ii) automatically search the identified file directory for new and updated EMS file data relative to a previous retrieval operation, (iii) automatically retrieve the new and updated EMS file data without human intervention in response to the search, and (iv) automatically send the retrieved EMS file data to a second computer system over the network without human intervention to thereby achieve a transmission of vehicle repair data to the second computer system without requiring a user of the repair facility computer system to enter estimate data into an application other than the estimating system; and
wherein the EMS data pump further comprises a validation table and a component, the component being configured to validate whether each retrieved EMS file includes all of its constituent standardized files based on a reference to the validation table.

76. The computer program product of claim 75 further comprising a configuration file stored on the computer-readable storage medium, wherein the configuration file defines a configurable parameter for identifying a platform of the estimating system used by the repair facility computer system, the configurable parameter identifying where in the file directory that the search is to be performed.

77. The computer program product of claim 75 wherein the EMS data pump is configured to run in the event mode, and wherein the EMS data pump comprises a notification application programming interface (API) for detecting when a change occurs in the file directory to thereby trigger the EMS data pump to run.

78. The computer program product of claim 75 wherein the EMS data pump comprises a component configured to (1) maintain a first list of previously retrieved EMS files, the first list including an identification corresponding to when the previously retrieved EMS files were last retrieved, (2) generate a second list of EMS files currently in the file directory, and (3) compare the first list with the second list to identify the new and updated EMS files for retrieval.

79. The computer program product of claim 75 wherein the EMS data pump further comprises a component that is configured to automatically send the retrieved EMS file data to the second computer system as a web service communication.

80. The computer program product of claim 75 wherein the plurality of instructions are further executable by a processor to perform a filtering operation on the retrieved vehicle repair data to send only a plurality of pre-selected data fields of the retrieved vehicle repair data to the second computer system.

* * * * *